US012017452B2

(12) United States Patent
Fukasawa et al.

(10) Patent No.: US 12,017,452 B2
(45) Date of Patent: Jun. 25, 2024

(54) PRINTING APPARATUS, CONTROL METHOD, AND STORAGE MEDIUM

(71) Applicant: CANON KABUSHIKI KAISHA, Tokyo (JP)

(72) Inventors: Takuya Fukasawa, Kawasaki (JP); Takatoshi Nakano, Yokohama (JP); Atsushi Takahashi, Tama (JP); Yoshinori Nakagawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 434 days.

(21) Appl. No.: 17/497,720

(22) Filed: Oct. 8, 2021

(65) Prior Publication Data

US 2022/0024203 A1 Jan. 27, 2022

Related U.S. Application Data

(63) Continuation of application No. 16/848,987, filed on Apr. 15, 2020, now Pat. No. 11,198,290, which is a (Continued)

(30) Foreign Application Priority Data

Jul. 3, 2017 (JP) ................................ 2017-130434

(51) Int. Cl.

*B41J 2/045* (2006.01)
*B41J 2/165* (2006.01)

(Continued)

(52) U.S. Cl.

CPC ....... *B41J 2/04573* (2013.01); *B41J 2/04586* (2013.01); *B41J 2/165* (2013.01);

(Continued)

(58) Field of Classification Search

CPC ........ B41J 2/175; B41J 29/13; B41J 2/16585; B41J 2/1714; B41J 2/17553; B41J 2/1721;

(Continued)

(56) References Cited

U.S. PATENT DOCUMENTS 5,617,122 A 4/1997 Numata et al. ................ 347/14
5,936,651 A 8/1999 Uchida et al. ................ 347/104

(Continued)

FOREIGN PATENT DOCUMENTS

CN 102848728 1/2013
CN 102848733 1/2013

(Continued)

OTHER PUBLICATIONS

Office Action dated Oct. 26, 2021 in counterpart Japanese Application No. 2021-128489, together with English translation thereof.

(Continued)

*Primary Examiner* — Thinh H Nguyen
(74) *Attorney, Agent, or Firm* — Venable LLP

(57) ABSTRACT

An object of the present invention is to bring a print head into a liquid ejectable state while reducing waste ink. The present invention is a printing apparatus including: a tank in which liquid is stored; a print head that comprises an ejection port surface on which an ejection port is formed, the ejection port ejecting the liquid which is supplied from the tank; a cap mechanism that caps the ejection port surface of the print head; a timer that counts a time during which the ejection port surface is capped; and a circulation unit configured to circulate the liquid in a circulation path including the tank and the print head, and in a case where the timer counts a predetermined time, the circulation unit circulates the liquid.

52 Claims, 19 Drawing Sheets

Related U.S. Application Data continuation of application No. 16/023,007, filed on Jun. 29, 2018, now Pat. No. 10,654,265.

(51) Int. Cl.
*B41J 2/17* (2006.01)
*B41J 2/18* (2006.01)

(52) U.S. Cl.
CPC ......... *B41J 2/16505* (2013.01); *B41J 2/1714* (2013.01); *B41J 2/18* (2013.01)

(58) Field of Classification Search
CPC .... B41J 2/04573; B41J 29/02; B41J 2/04586; B41J 2/18; B41J 2002/1856; B41J 2/165; B41J 2/16505; B41J 2/17503; B41J 2/17513; B41J 2/2114
See application file for complete search history.

(56) References Cited

U.S. PATENT DOCUMENTS

| | | | | |
|---|---|---|---|---|
| 6,299,277 | B1 | 10/2001 | Fujii | 347/23 |
| 6,394,571 | B1 | 5/2002 | Yano et al. | 347/17 |
| 6,820,966 | B1 | 11/2004 | Drury et al. | 347/57 |
| 7,650,850 | B2 | 1/2010 | Iwasaki et al. | 118/300 |
| 7,794,041 | B2 | 9/2010 | Akase et al. | 347/19 |
| 8,517,518 | B2 | 8/2013 | Kashu et al. | 347/66 |
| 8,690,292 | B1 | 4/2014 | Rimai et al. | 347/34 |
| 8,726,834 | B2 | 5/2014 | Nakagawa et al. | 118/692 |
| 9,162,453 | B2 | 10/2015 | Cruz-Uribe et al. | B41J 29/377 |
| 9,724,926 | B2 | 8/2017 | Keefe et al. | B41J 2/18 |
| 9,751,317 | B2 | 9/2017 | Nakamura et al. | B41J 2/17506 |
| 9,827,769 | B2 | 11/2017 | Kobayashi | B41J 2/16552 |
| 10,040,209 | B2 | 8/2018 | Atkins | B26B 19/06 |
| 10,336,091 | B2 | 7/2019 | Nakagawa et al. | B41J 2/14145 |
| 10,363,747 | B2 | 7/2019 | Okushima et al. | B41J 2/14024 |
| 10,543,680 | B2 | 1/2020 | Fukasawa et al. | B41J 2/18 |
| 10,654,265 | B2 | 5/2020 | Fukasawa et al. | B41J 2/16505 |
| 10,919,301 | B2 | 2/2021 | Okushima et al. | B41J 2/14072 |
| 2005/0052513 | A1 | 3/2005 | Inoue | 347/89 |
| 2010/0073444 | A1 | 3/2010 | Sato | B41J 2/185 |
| 2011/0115844 | A1 | 5/2011 | Ozawa | B41J 2/165 |
| 2013/0002741 | A1 | 1/2013 | Takahashi | 347/6 |
| 2013/0083136 | A1 | 4/2013 | Govyadinov et al. | B41J 2/17596 |
| 2013/0182033 | A1 | 7/2013 | Ito | 347/23 |
| 2014/0168295 | A1 | 6/2014 | Ichihara et al. | B41J 2/175 |
| 2014/0176641 | A1 | 6/2014 | Hawryschuk et al. | 347/32 |
| 2014/0198153 | A1 | 7/2014 | Nakanishi | B41J 2/165 |
| 2014/0300670 | A1* | 10/2014 | Tsukamoto | B41J 2/175 347/85 |
| 2015/0191022 | A1 | 7/2015 | Matsumoto et al. | 347/85 |
| 2015/0314607 | A1 | 11/2015 | Moriguchi et al. | B05B 7/24 |
| 2016/0288521 | A1 | 10/2016 | Araki et al. | B41J 2/175 |
| 2017/0210126 | A1 | 7/2017 | Kato | B41J 2/04563 |
| 2018/0001623 | A1 | 1/2018 | Nakano et al. | B41J 2/195 |
| 2019/0001670 | A1 | 1/2019 | Fukasawa et al. | B41J 2/04573 |
| 2019/0009590 | A1 | 1/2019 | Fukasawa et al. | B41J 2/16532 |
| 2020/0230971 | A1 | 7/2020 | Nishizawa et al. | B41J 2/18 |

FOREIGN PATENT DOCUMENTS

| | | |
|---|---|---|
| CN | 103534097 | 1/2014 |
| CN | 105667091 | 6/2016 |
| EP | 2540508 | 1/2013 |
| EP | 2759408 | 7/2014 |
| JP | H03-213350 | 9/1991 |
| JP | H11-192724 | 7/1999 |
| JP | 2002-234175 | 8/2002 |
| JP | 2004-291385 | 10/2004 |
| JP | 2006-088493 | 4/2006 |
| JP | 2008-044337 | 2/2008 |
| JP | 2009-072921 | 4/2009 |
| JP | 2009-190229 | 8/2009 |
| JP | 2010-076206 | 4/2010 |
| JP | 2011-062867 | 3/2011 |
| JP | 2011-245869 | 12/2011 |
| JP | 2012-000883 | 1/2012 |
| JP | 2012-171106 | 9/2012 |
| JP | 2013-075482 | 4/2013 |
| JP | 2013-107403 | 6/2013 |
| JP | 2014-097619 | 5/2014 |
| JP | 2014-117898 | 6/2014 |
| JP | 2015-047716 | 3/2015 |
| JP | 2015-221555 | 12/2015 |
| JP | 2016-041516 | 3/2016 |
| JP | 2017-080892 | 5/2017 |
| JP | 2017-080896 | 5/2017 |
| JP | 2017-132096 | 8/2017 |
| JP | 2019-014249 | 1/2019 |
| KR | 2011-0025767 | 3/2011 |
| KR | 2014-0064876 | 5/2014 |
| KR | 2016-0118941 | 10/2016 |
| WO | 2014/148475 | 9/2014 |
| WO | 2016/018322 | 2/2016 |

OTHER PUBLICATIONS

Office Action dated Nov. 29, 2022 in counterpart Japanese Application No. 2018-126878, together with English translation thereof.
Notice of Allowance dated Nov. 23, 2022 in counterpart Korean Application No. 10-2022-0016350, together with English translation thereof.
Written Decision on Registration dated Nov. 3, 2023 in counterpart Korean Application No. 10-2023-0024262, together with English translation thereof.
Office Action dated Nov. 22, 2022 in counterpart Japanese Application No. 2022-076533, together with English translation thereof.
Office Action dated Apr. 21, 2021 in counterpart Korean Application No. 10-2018-0076311, together with English translation thereof.
European Search Report issued in corresponding European Application No. 18177269.0 dated Nov. 20, 2018.
Chinese Office Action, dated Mar. 23, 2020, in corresponding Chinese Application No. 201810713829.4, together with English translation thereof.
Notice of Allowance dated Nov. 8, 2021 in counterpart Korean Application No. 10-2018-0076311, together with English translation thereof.
Office Action dated May 24, 2022 in counterpart Japanese Application No. 2018-126878, together with English translation thereof.
Office Action dated May 20, 2022 in counterpart Korean Application No. 10-2022-0016350, together with English translation thereof.

* cited by examiner

| Within-cap evaporation count | Larger than or equal to 0 and less than 100 | Larger than or equal to 100 and less than 200 | Larger than or equal to 200 and less than 300 | Larger than or equal to 300 and less than 400 | Larger than or equal to 400 and less than 500 |
|---|---|---|---|---|---|
| Circulation interval | 120h | 48h | 18h | 6h | 3h |

FIG.14A

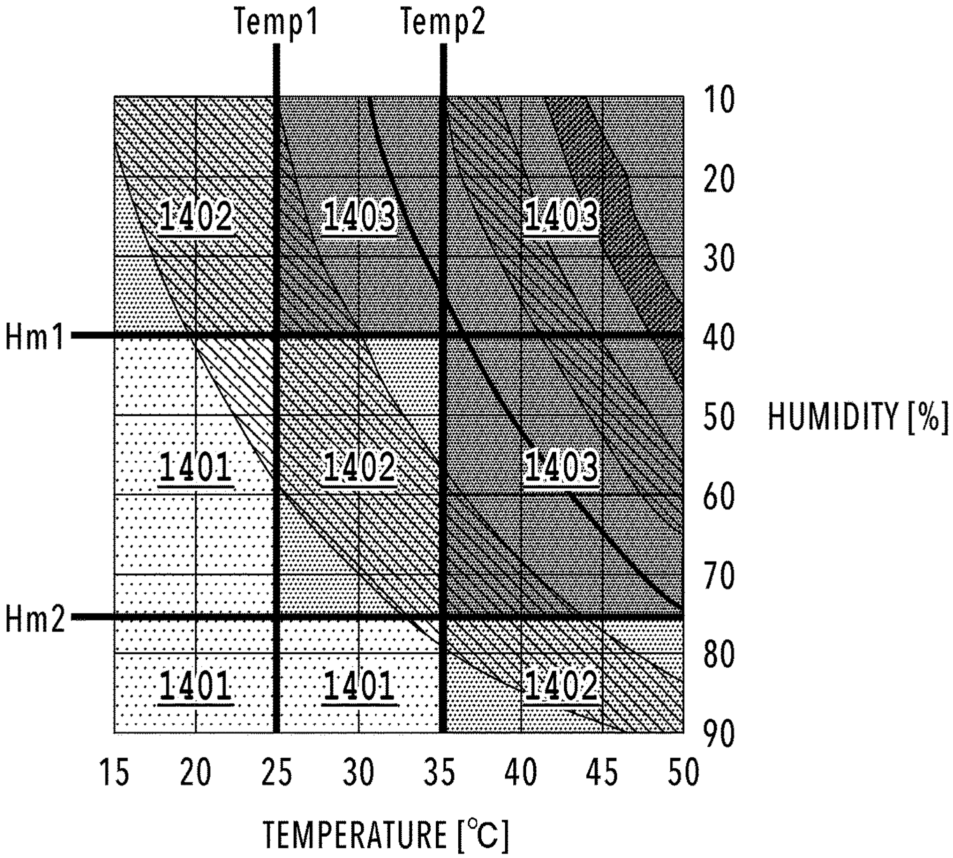

FIG.14B

| | EVAPORATION SPEED COEFFICIENT |
|---|---|
| FIRST TEMPERATURE AND HUMIDITY STATE | 1.0 |
| SECOND TEMPERATURE AND HUMIDITY STATE | 2.0 |
| THIRD TEMPERATURE AND HUMIDITY STATE | 4.0 |

FIG.14C

FIG.15A
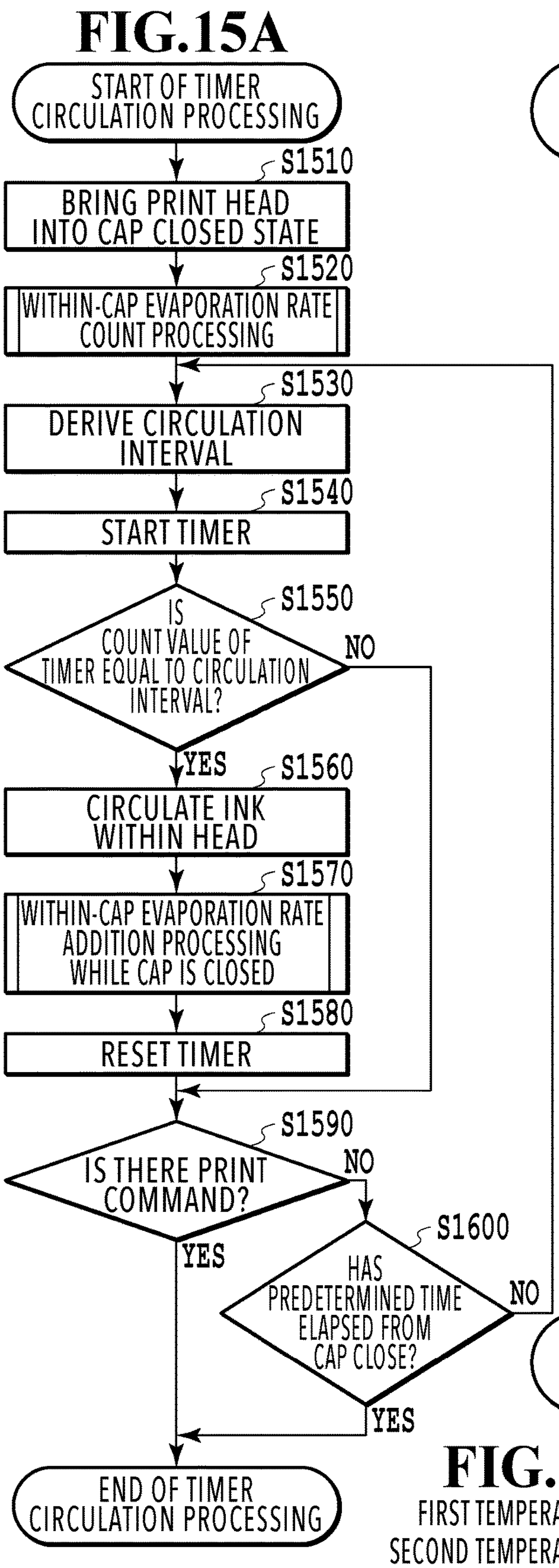
FIG.15B
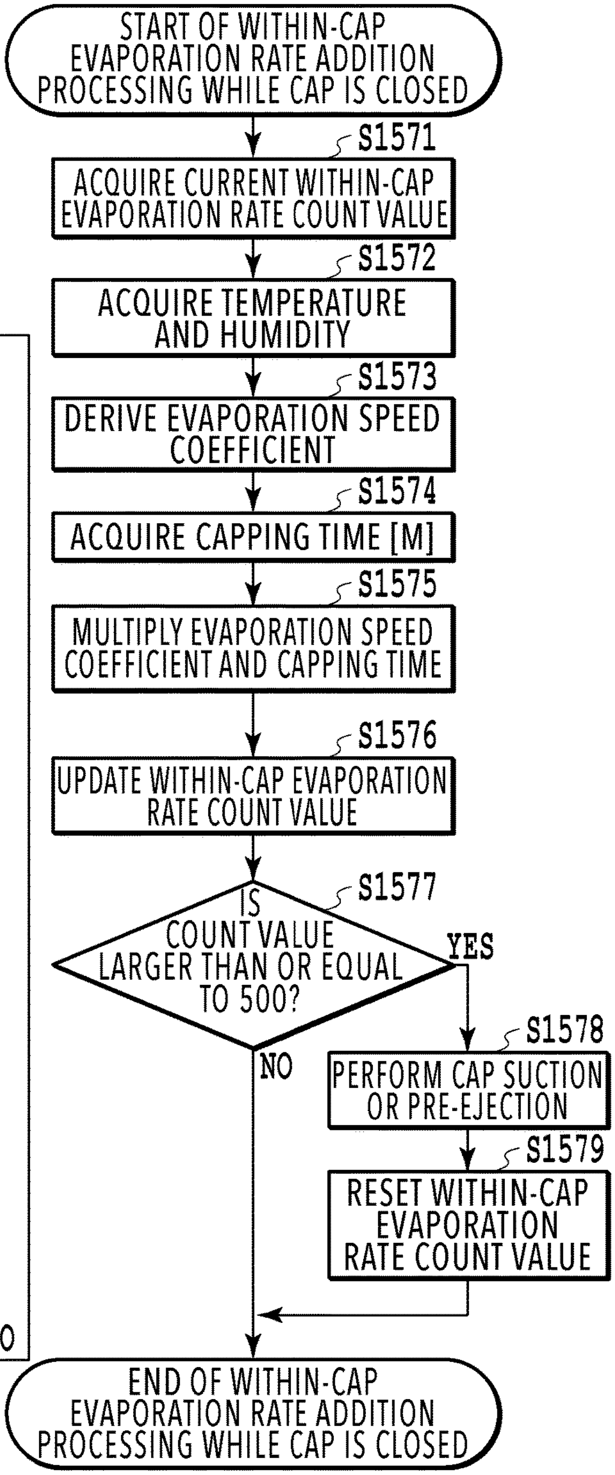
FIG.15C
| | EVAPORATION SPEED COEFFICIENT |
|---|---|
| FIRST TEMPERATURE AND HUMIDITY STATE | 0.01 |
| SECOND TEMPERATURE AND HUMIDITY STATE | 0.02 |
| THIRD TEMPERATURE AND HUMIDITY STATE | 0.04 |

TABLE HOLDING CIRCULATION INTERVAL [hr]

| | Within-cap evaporation rate count | | | | |
|---|---|---|---|---|---|
| Density Nc | Larger than or equal to 0 and less than 100 | Larger than or equal to 100 and less than 200 | Larger than or equal to 200 and less than 300 | Larger than or equal to 300 and less than 400 | Larger than or equal to 400 and less than 500 |
| Larger than or equal to 0.080 and less than 0.084 | 120 | 48 | 18 | 6 | 3 |
| Larger than or equal to 0.084 and less than 0.089 | 90 | 36 | 13.5 | 4.5 | 2.25 |
| Larger than or equal to 0.089 | 60 | 24 | 9 | 3 | 1.5 |

FIG.16

| | Circulation execution time |
|---|---|
| Lower than or equal to 15°C | 3 m |
| Higher than 15°C and lower than or equal to 25°C | 2 m |
| Higher than 25°C | 1 m |

| | Circulation execution time |
|---|---|
| 40°C by head temperature adjustment mechanism | 30 s |
| 50°C by head temperature adjustment mechanism | 20 s |

FIG.18

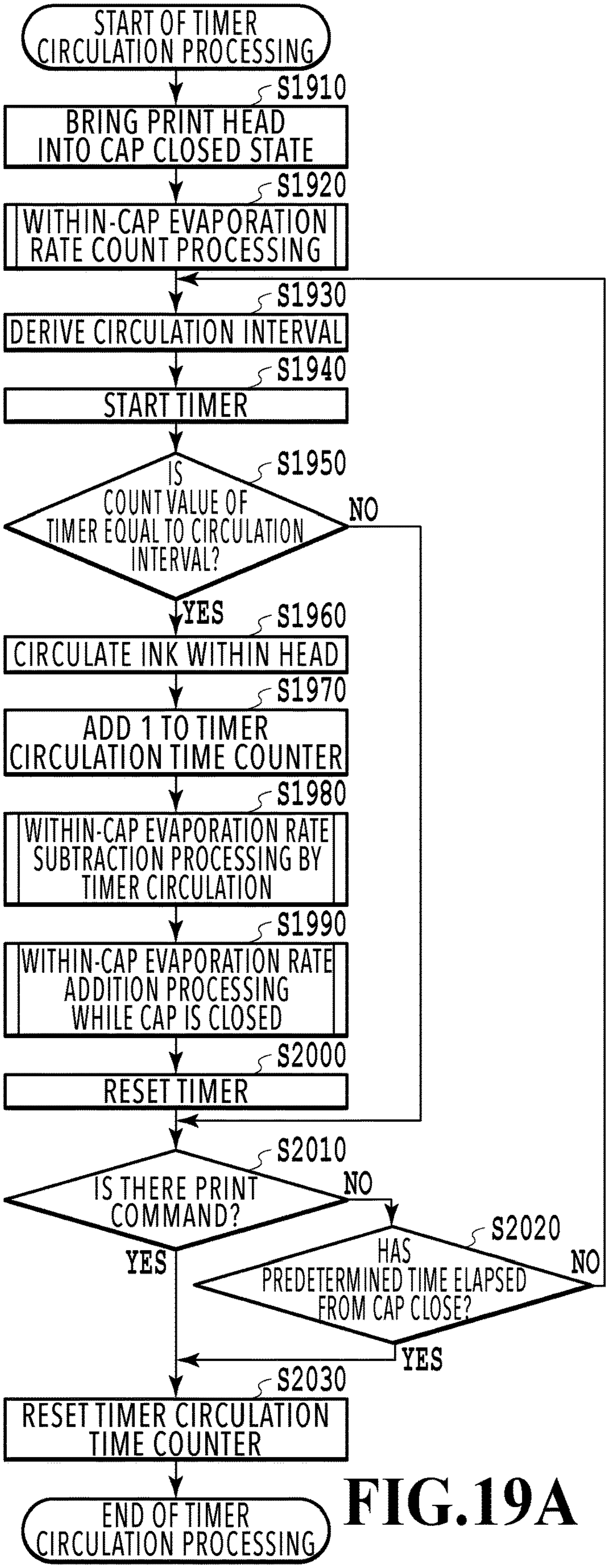
FIG.19A
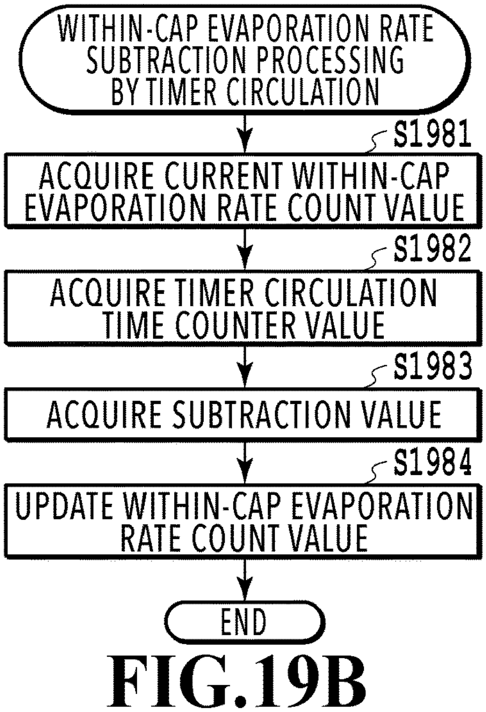
FIG.19B
| Timer circulation time counter | Subtraction value |
|---|---|
| ≦4 | 4 |
| 4< | 3.5 |
| 8< | 3 |
| 12< | 2.5 |
| 16< | 2 |
| 20< | 1.5 |
| 24< | 1 |
| 28< | 0.5 |
| 32< | 0 |
FIG.19C

PRINTING APPARATUS, CONTROL METHOD, AND STORAGE MEDIUM

This application is a continuation of application Ser. No. 16/848,987 filed Apr. 15, 2020, currently pending, which is a continuation of application Ser. No. 16/023,007 filed Jun. 29, 2018, now U.S. Pat. No. 10,654,265 issued May 19, 2020; and claims priority under 35 U.S.C. § 119 to Japan Application JP 2017-130434 filed in Japan on Jul. 3, 2017; and the contents of all of which are incorporated herein by reference as if set forth in full.

BACKGROUND OF THE INVENTION

Field of the Invention

The present invention relates to a printing apparatus, a control method, and a storage medium.

Description of the Related Art

Japanese Patent Laid-Open No. 2008-44337 has disclosed a printer that resolves clogging of a nozzle by forcibly discharging an amount of ink in accordance with the effective amount of moisture in the ink.

SUMMARY OF THE INVENTION

However, in Japanese Patent Laid-Open No. 2008-44337, ink is discharged to resolve clogging, and therefore, there is such a problem that waste ink occurs.

Consequently, in view of the above-described problem, an object of the present invention is to bring a print head into a state of capable of ejecting a liquid, such as ink, while reducing waste ink.

The present invention is a printing apparatus having: a tank in which liquid is stored; a print head that comprises an ejection port surface on which an ejection port is formed, the ejection port ejecting the liquid which is supplied from the tank; a cap mechanism that caps the ejection port surface of the print head; a timer that counts a time during which the ejection port surface is capped; and a circulation unit configured to circulate the liquid in a circulation path including the tank and the print head, and in a case where the timer counts a predetermined time, the circulation unit circulates the liquid.

Further features of the present invention will become apparent from the following description of exemplary embodiments with reference to the attached drawings.

BRIEF DESCRIPTION OF THE DRAWINGS

FIG. 14A, FIG. 14B, and FIG. 14C are explanatory diagrams of the timer circulation processing in the second embodiment;

FIG. 15A, FIG. 15B, and FIG. 15C are explanatory diagrams of timer circulation processing in a third embodiment;

FIG. 16 is an explanatory diagram of timer circulation processing in a fourth embodiment;

FIG. 18 is an explanatory diagram of timer circulation processing in a sixth embodiment; and FIG. 19A, FIG. 19B, and FIG. 19C are explanatory diagrams of timer circulation processing in a seventh embodiment.

DESCRIPTION OF THE EMBODIMENTS

In the following, with reference to the drawings, a liquid ejection head and a liquid ejection apparatus according to embodiments of the present invention are explained. In the following embodiments, an ink jet print head that ejects ink and an ink jet printing apparatus are explained with a specific configuration, but the present invention is not limited to this. For example, it is possible to apply the present invention also to a serial head printer, not limited to a line head printer. Further, it is possible to apply the liquid ejection head, the liquid ejection apparatus, and a supply method of liquid of the present invention to a printer, a copy machine, a facsimile having a communication system, an apparatus, such as a word processor having a printer unit, and further, an industrial printing apparatus combined compositely with various processing apparatuses. For example, it is possible to use the present invention for use of biochip manufacturing, electronic circuit printing, and so on. The embodiments described below are specific examples of the present invention, and therefore, various technically favorable restrictions are imposed. However, as long as the spirit of the present invention is observed, the embodiments are not limited to the embodiments described below or other specific methods.

About Internal Configuration of Printing Apparatus

Figure 1:
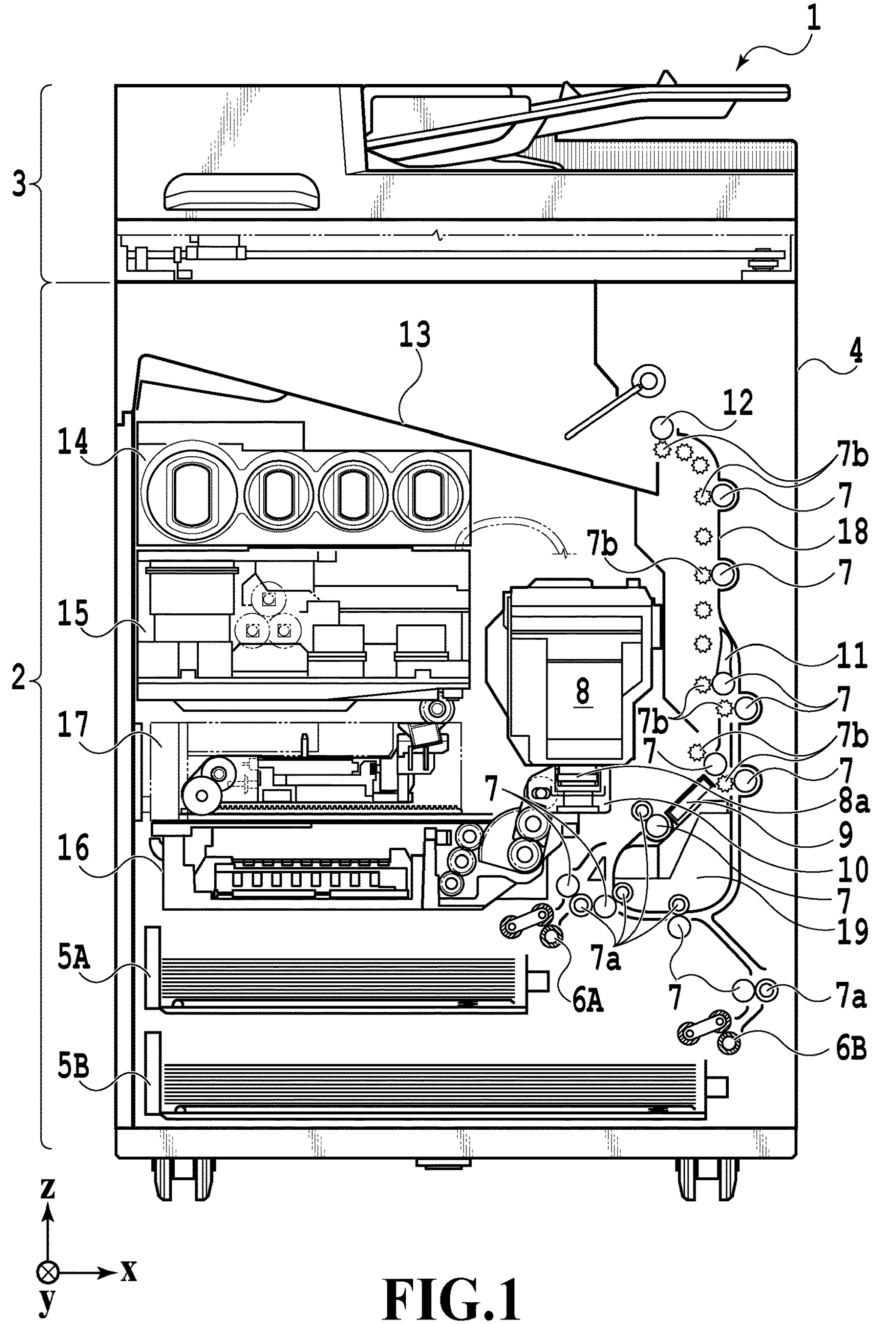
FIG. 1 is a diagram in the case where a printing apparatus is in a standby state.

FIG. 1 is an internal configuration diagram of an ink jet printing apparatus 1 (hereinafter, printing apparatus 1). In FIG. 1, the x-direction indicates the horizontal direction, the y-direction (direction perpendicular to the paper surface) indicates the direction in which ejection ports are arrayed in a print head 8, to be described later, and the z-direction indicates the vertical direction, respectively.

The printing apparatus 1 is an MFP (Multi Function Printer) including a print unit 2 and a scanner unit 3 and capable of performing various kinds of processing relating to the printing operation and the reading operation by the print unit 2 and the scanner unit 3 individually, or by an interlocking manner of the print unit 2 and the scanner unit 3. The scanner unit 3 includes an ADF (Auto Document Feeder) and an FBS (Flat Bed Scanner) and is capable of reading of a document automatically fed by the ADF and reading (scanning) of a document placed on a document table of the FBS by a user. Here, the MFP having both the print unit 2 and the scanner unit 3 is shown, but the MFP may be an aspect in which the scanner unit 3 is not included. FIG. 1 shows the case where the printing apparatus 1 is in a standby state where the printing apparatus 1 is performing neither the printing operation nor the reading operation.

In the print unit 2, at the bottom in the vertically downward direction of a body 4, a first cassette 5A and a second cassette 5B for storing a printing medium (cut sheet) S are installed in an attachable and detachable manner. In the first cassette 5A, comparatively small printing media up to the A4 size, and in the second cassette 5B, comparatively large printing media up to the A3 size are stored in a piled-up manner. In the vicinity of the first cassette 5A, a first feed unit 6A for feeding stored printing media by separating one by one is provided. Similarly, in the vicinity of the second cassette 5B, a second feed unit 6B is provided. In the case where the printing operation is performed, the printing medium S is selectively fed from one of the cassettes.

A conveyance roller 7, a discharge roller 12, a pinch roller 7*a*, a spur 7*b*, a guide 18, an inner guide 19, and a flapper 11 are conveyance mechanisms for guiding the printing medium S in a predetermined direction. The conveyance roller 7 is arranged on the upstream side and on the downstream side of the print head 8 and is a drive roller that is driven by a conveyance motor, not shown schematically. The pinch roller 7*a* is a follower roller that nips and rotates the printing medium S together with the conveyance roller 7. The discharge roller 12 is arranged on the downstream side of the conveyance roller 7 and is a drive roller that is driven by a conveyance roller, not shown schematically. The spur 7*b* sandwiches and conveys the printing medium S together with the conveyance roller 7 arranged on the downstream side of the print head 8 and the discharge roller 12.

The guide 18 is provided in the conveyance path of the printing medium S and guides the printing medium S in a predetermined direction. The inner guide 19 is a member extending in the y-direction and having a curved side surface. The inner guide 19 guides the printing medium S along a side surface of the printing medium S. The flapper 11 is a member for switching directions in which the printing medium S is conveyed when a printing operation is carried out on both sides of the printing medium S (both-side printing). A discharge tray 13 is a tray for loading and holding the printing medium S for which the printing operation has been completed and which is discharged by the discharge roller 12.

The print head 8 is a color ink jet print head of full line type and in which a plurality of ejection ports from which ink is ejected in accordance with print data is arrayed along the y-direction in FIG. 1 so as to correspond to the width of the printing medium S. In the case where the print head 8 is at the standby position, an ejection port surface 8*a* faces in the vertically downward direction and is capped by a cap unit 10 as shown in FIG. 1. In the case where the printing operation is performed, by a print controller 202, to be described later, the direction of the print head 8 is changed so that the ejection port surface 8*a* faces a platen 9. The platen 9 is made up of a flat plate extending in the y-direction and supports the printing medium S from the rear side, for which the printing operation is performed by the print head 8. The movement of the print head 8 from the standby position to the printing position will be described later in detail.

An ink tank unit 14 stores four color inks to be supplied to the print head 8, respectively. The four color inks here refer to inks of cyan (C), magenta (M), yellow (Y), and black (K). An ink supply unit 15 is provided on the way in the flow path connecting the ink tank unit 14 and the print head 8 and adjusts the pressure and the amount of flow of the ink within the print head 8 to an appropriate range. The printing apparatus 1 has a circulation-type ink supply system and the ink supply unit 15 adjusts the pressure of the ink supplied to the print head 8 and the amount of flow of the ink recovered from the print head 8 to an appropriate range.

A maintenance unit 16 includes the cap unit 10 and a wiping unit 17 and performs the maintenance operation for the print head 8 by causing these units to operate at predetermined timing. The maintenance operation will be explained later in detail.

About Control Configuration of Printing Apparatus

Figure 2:
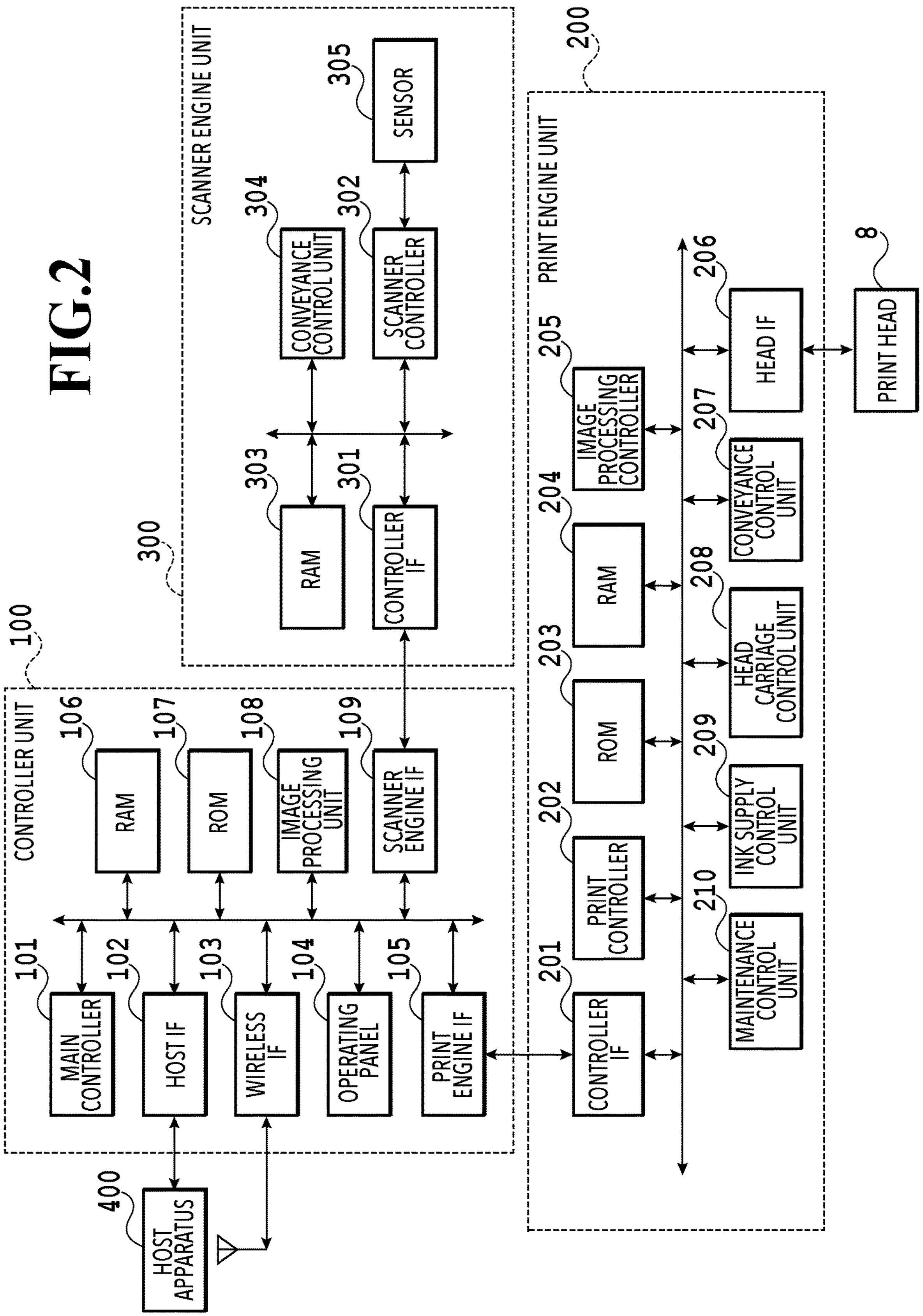
FIG. 2 is a block diagram showing a control configuration of the printing apparatus.

FIG. 2 is a block diagram showing a control configuration in the printing apparatus 1. The printing apparatus 1 mainly includes a print engine unit 200 configured to centralizedly control the print unit 2, a scanner engine unit 300 configured to centralizedly control the scanner unit 3, and a controller unit 100 configured to centralizedly control the entire printing apparatus 1. The print controller 202 controls various mechanisms of the print engine unit 200 in accordance with instructions of a main controller 101 of the controller unit 100. Various mechanisms of the scanner engine unit 300 are controlled by the main controller 101 of the controller unit 100. In the following, details of the control configuration are explained.

In the controller unit 100, the main controller 101 including a CPU controls the entire printing apparatus 1 by using a RAM 106 as a work area in accordance with programs and various parameters stored in a ROM 107. For example, in the case where a print job is input from a host apparatus 400 via a host I/F 102 or a wireless I/F 103, predetermined image processing is performed for image data received by an image processing unit 108 in accordance with instructions of the main controller 101. Then, the main controller 101 transmits the image data for which image processing has been performed to the print engine unit 200 via a print engine I/F 105.

The printing apparatus 1 may acquire image data from the host apparatus 400 via wireless communication or wired communication or may acquire image data from an external storage device (USB memory and the like) connected to the printing apparatus 1. The communication method that is made use of for wireless communication or wired communication is not limited. For example, as the communication method that is made use of for wireless communication, it is possible to apply Wi-Fi (Wireless Fidelity) (registered trademark) and Bluetooth (registered trademark). Further, as the communication method that is made use of for wired communication, it is possible to apply USB (Universal Serial Bus) and the like. Furthermore, for example, in the case where a read command is input from the host apparatus 400, the main controller 101 transmits this command to the scanner engine unit 300 via a scanner engine I/F 109.

An operation panel 104 (operating unit) is a mechanism for a user to provide input into the printing apparatus 1 and receive output from the printing apparatus 1. Via the operation panel 104 a user can give instructions for the operation, such as copy and scan, to set a printing mode, to recognize information about the printing apparatus 1, and so on.

In the print engine unit 200, the print controller 202, including a CPU controls, various mechanisms included in the print unit 2 by using a RAM 204 as a work area in accordance with programs and various parameters stored in a ROM 203. In the case where various commands and image data are received via a controller I/F 201, the print controller 202 temporarily stores them in the RAM 204. The print controller 202 causes an image processing controller 205 to convert the saved image data into print data so that the print head 8 can make use of the print data for the printing operation. In the case where print data is generated, the print controller 202 causes the print head 8 to perform the printing operation based on the print data via a head I/F 206. At this time, the print controller 202 conveys the printing medium S by driving the feed units 6A and 6B, the conveyance roller 7, the discharge roller 12, and the flapper 11 (shown in FIG. 1) via a conveyance control unit 207. In accordance with instructions of the print controller 202, the printing operation by the print head 8 is performed together with the conveyance operation of the printing medium S, and thus, printing processing is performed.

A head carriage control unit 208 changes the direction and position of the print head 8 in accordance with the operating state, such as the maintenance state and the printing state, of the printing apparatus 1. An ink supply control unit 209 controls the ink supply unit 15 so that the pressure of the ink supplied to the print head 8 is adjusted within an appropriate range. A maintenance control unit 210 controls the operation of the cleaning mechanisms, such as the cap unit 10 and the wiping unit 17 in the maintenance unit 16, at the time of performing the maintenance operation for the print head 8.

In the scanner engine unit 300, the main controller 101 controls hardware resources of a scanner controller 302 by using the RAM 106 as a work area in accordance with programs and various parameters stored in the ROM 107. Due to this, various mechanisms included in the scanner unit 3 are controlled. For example, by the main controller 101 controlling the hardware resources within the scanner controller 302 via a controller I/F 301, a document mounted on the ADF by a user is conveyed via a conveyance control unit 304 and read by a sensor 305. Then, the scanner controller 302 saves the read image data in a RAM 303. It is possible for the print controller 202 to cause the print head 8 to perform the printing operation based on the image data read by the scanner controller 302 by converting the image data acquired as described above into print data.

About Operation of Printing Apparatus in Printing State

Figure 3:
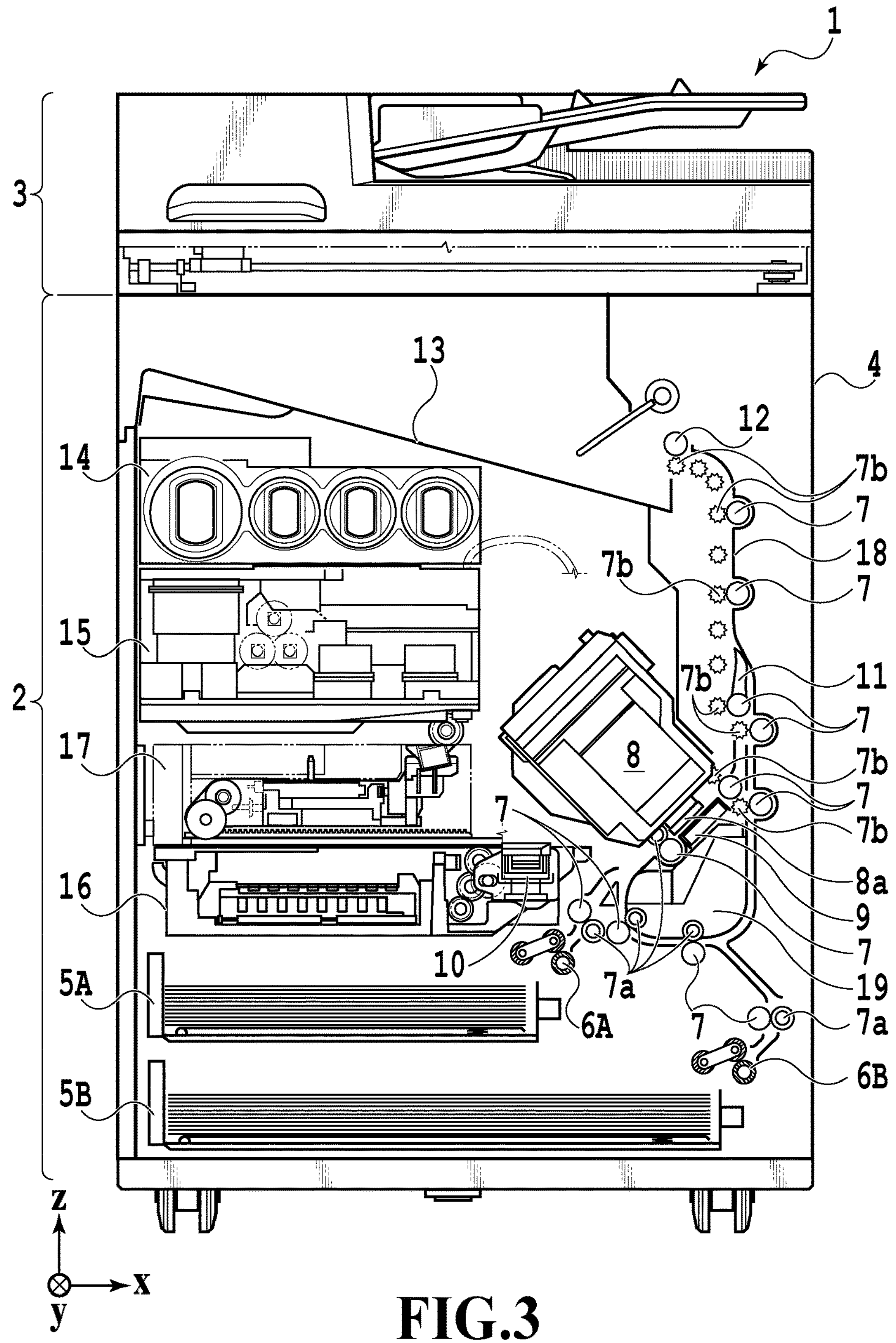
FIG. 3 is a diagram in the case where the printing apparatus is in a printing state.

FIG. 3 shows the case where the printing apparatus 1 is in the printing state. Compared to the standby state shown in FIG. 1, the cap unit 10 separates from the ejection port surface 8*a* of the print head 8 and the ejection port surface 8*a* faces the platen 9. The plane of the platen 9 is inclined about 45 degrees with respect to the horizontal direction and the ejection port surface 8*a* of the print head 8 at the printing position is also inclined about 45 degrees with respect to the horizontal direction so that the distance from the platen 9 is maintained at a constant value.

At the time of moving the print head 8 from the standby position shown in FIG. 1 to the printing position shown in FIG. 3, the print controller 202 lowers the cap unit 10 down to the evacuate position shown in FIG. 3 by using the maintenance control unit 210. Due to this, the ejection port surface 8*a* of the print head 8 separates from a cap member 10*a*. After this, the print controller 202 rotates the print head 8 by 45 degrees while adjusting the height in the vertical direction of the print head 8 by using the head carriage control unit 208 and causes the ejection port surface 8*a* to face the platen 9. In the case where the printing operation is completed and the print head 8 moves from the printing position to the standby position, the process opposite to that described above is performed by the print controller 202.

Next, the conveyance path of the printing medium S in the print unit 2 is explained. In the case where a print command is input, first, the print controller 202 moves the print head 8 to the printing position shown in FIG. 3 by using the maintenance control unit 210 and the head carriage control unit 208. After this, the print controller 202 drives one of the first feed unit 6A and the second feed unit 6B in accordance with the print command by using the conveyance control unit 207 and feeds the printing medium S.

Figure 4C:
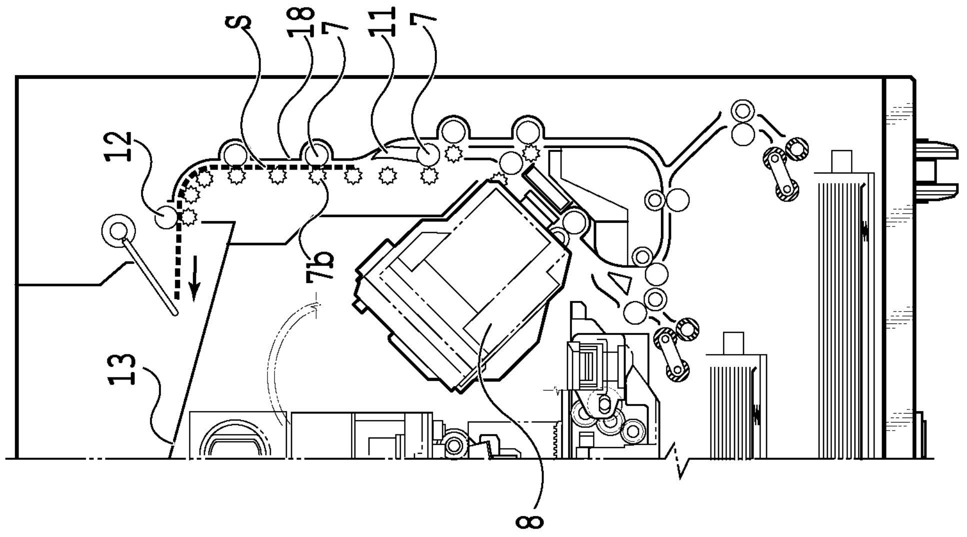
FIG. 4A, FIG. 4B, and FIG. 4C are conveyance path diagrams of a printing medium fed from a first cassette.
Figure 4B:
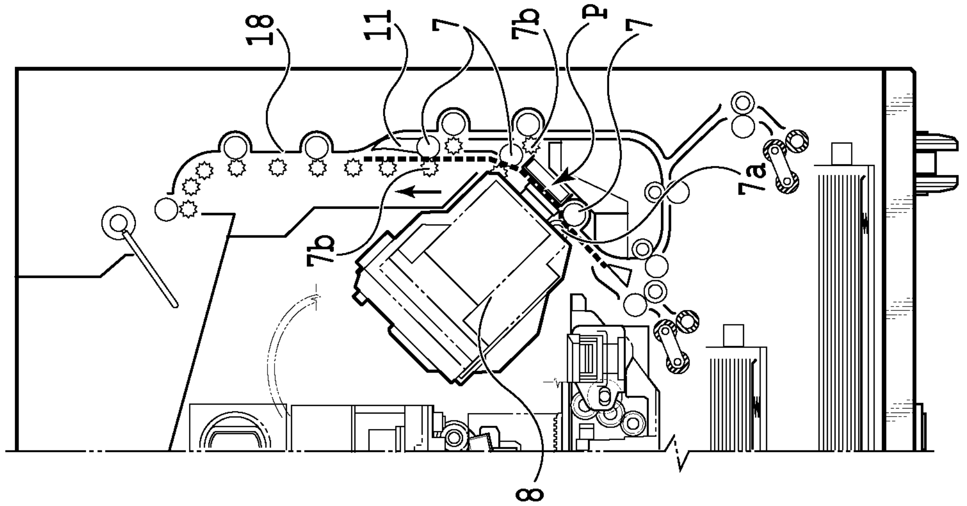
Figure 4A:
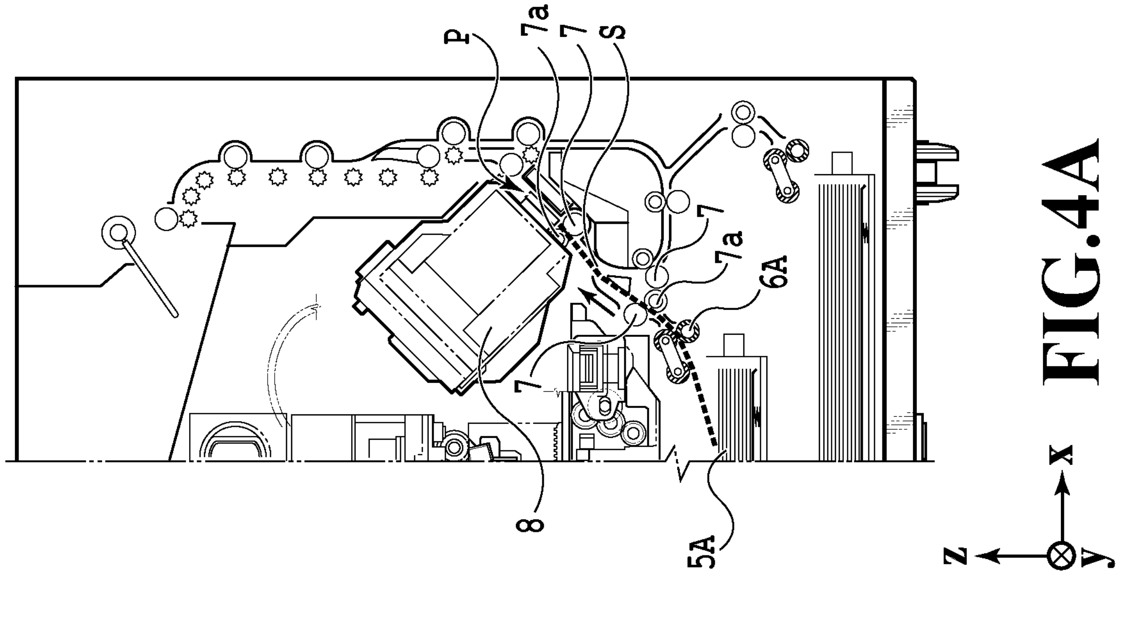

FIG. 4A to FIG. 4C are diagrams showing the conveyance path in the case where the printing medium S of the A4 size stored in the first cassette 5A is fed. The printing medium S loaded on the top within the first cassette 5A is separated from the second and subsequent printing media by the first feed unit 6A and conveyed toward a printing area P between the platen 9 and the print head 8 while being nipped by the conveyance roller 7 and the pinch roller 7*a*. FIG. 4A shows the conveyance state immediately before the front end of the printing medium S reaches the printing area P. The advancement direction of the printing medium S is changed from the horizontal direction (x-direction) to the direction about 45 degrees inclined with respect to the horizontal direction before the printing medium S reaches the printing area P by being fed by the first feed unit 6A.

In the printing area P, ink is ejected toward the printing medium S from a plurality of ejection ports provided in the print head 8. The printing medium S in the area where ink is given is supported by the platen 9 at its rear side and the distance between the ejection port surface 8*a* and the printing medium S is kept constant. The printing medium S after ink is given passes the left side of the flapper 11 whose front end is inclined to the right and is conveyed in the vertically upward direction of the printing apparatus 1 along the guide 18 while being guided by the conveyance roller 7 and the spur 7*b*. FIG. 4B shows the state where the front end of the printing medium S passes the printing area P and is conveyed in the vertically upward direction. The advancement direction of the printing medium S is changed from the position of the printing area P about 45 degrees inclined with respect to the horizontal direction to the vertically upward direction by the conveyance roller 7 and the spur 7*b*.

After being conveyed in the vertically upward direction, the printing medium S is discharged to the discharge tray 13 by the discharge roller 12 and the spur 7*b*. FIG. 4C shows the state where the front end of the printing medium S passes the discharge roller 12 and is discharged to the discharge tray 13. The discharged printing medium S is held on the discharge tray 13 in the state where the side on which an image is printed by the print head 8 faces downward.

Figure 5C:
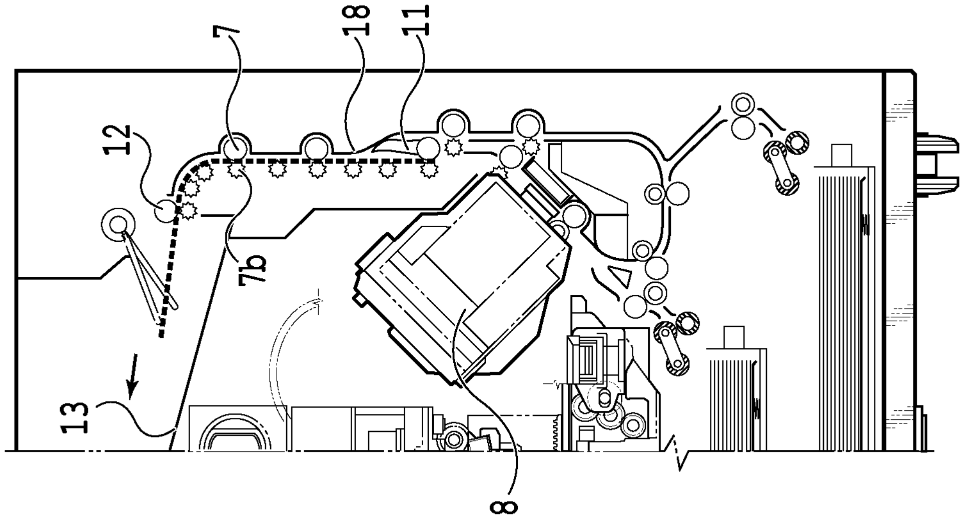
FIG. 5A, FIG. 5B, and FIG. 5C are conveyance path diagrams of a printing medium fed from a second cassette.
Figure 5B:
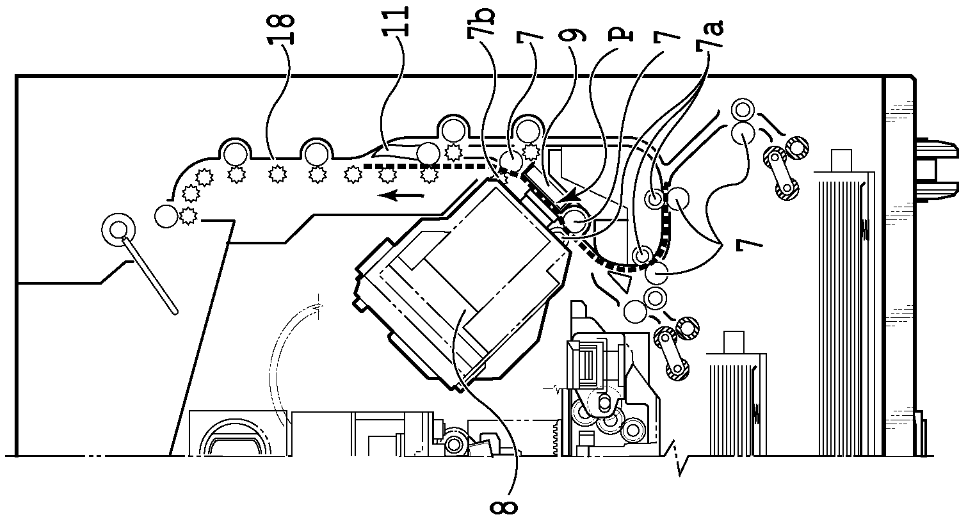
Figure 5A:
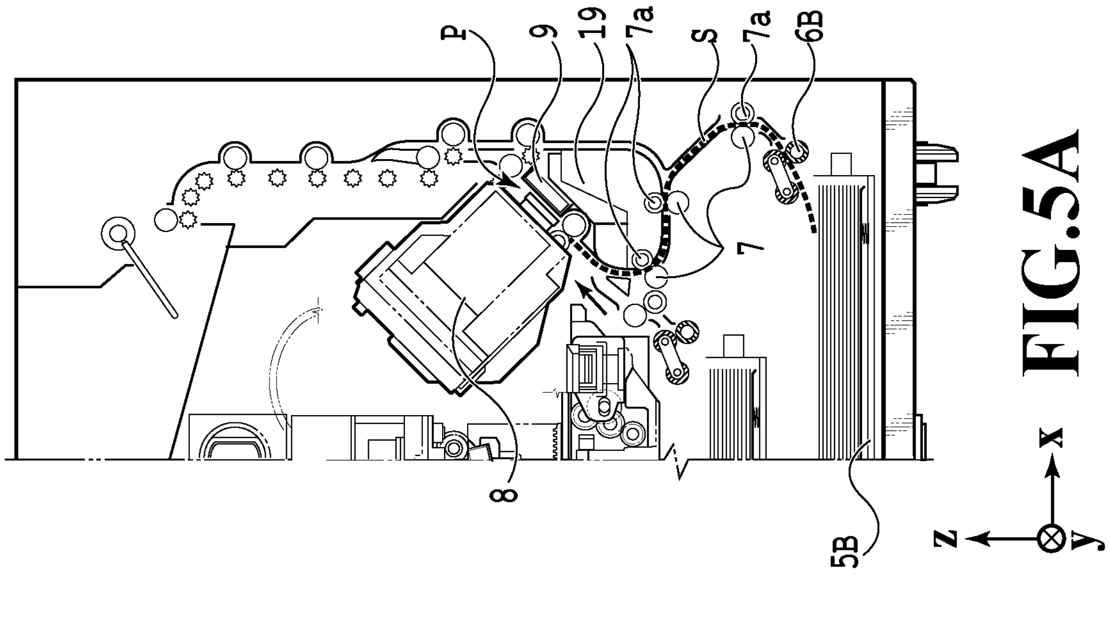

FIG. 5A to FIG. 5C are diagrams showing the conveyance path in the case where the printing medium S of the A3 size stored in the second cassette 5B is fed. The printing medium S loaded on the top within the second cassette 5B is separated from the second and subsequent printing media by the second feed unit 6B and conveyed toward the printing area P between the platen 9 and the print head 8 while being nipped by the conveyance roller 7 and the pinch roller 7*a*.

FIG. 5A shows the conveyance state immediately before the front end of the printing medium S reaches the printing area P. In the conveyance path until the printing medium S reaches the printing area P by being fed by the second feed unit 6B, a plurality of the conveyance rollers 7, a plurality of the pinch rollers 7*a*, and the inner guide 19 are arranged, and thereby, the printing medium S is curved into an S-shape and conveyed up to the platen 9.

The conveyance path after this is the same as in the case of the printing medium S of the A4 size shown in FIG. 4B and FIG. 4C. FIG. 5B shows the state where the front end of the printing medium S passes the printing area P and is conveyed in the vertically upward direction. FIG. 5C shows the state where the front end of the printing medium S passes the discharge roller 12 and is discharged to the discharge tray 13.

FIG. 6A to FIG. 6D show the conveyance path in the case where the printing operation (both-side printing) is performed on the backside (second side) of the printing medium S of the A4 size. In the case where the both-side printing is performed, after the first side (surface) is printed, the printing operation is performed on the second side (backside). The conveyance process at the time of printing the first side is the same as that in FIG. 4A to FIG. 4C, and therefore, explanation is omitted here. In the following, the conveyance process after that in FIG. 4C is explained.

Figure 6A:
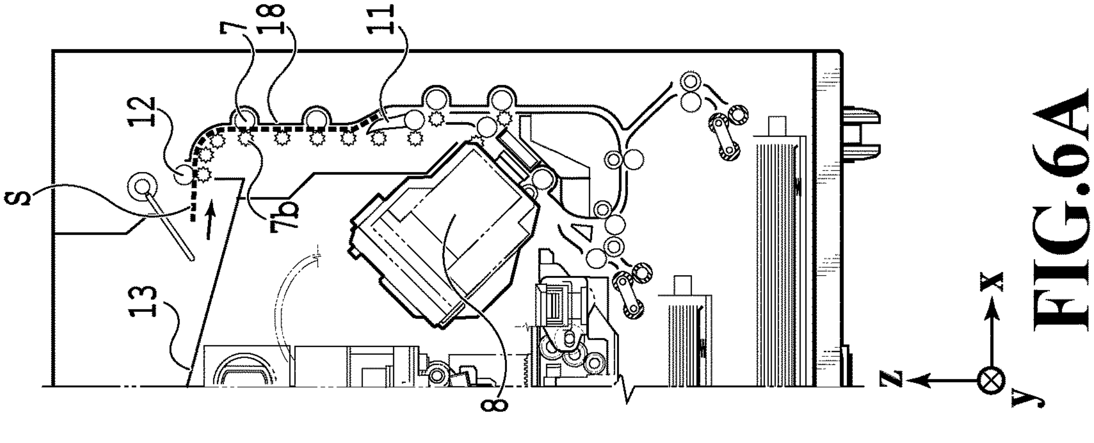
FIG. 6A, FIG. 6B, FIG. 6C, and FIG. 6D are conveyance path diagrams in the case where a printing operation is performed on the backside of a printing medium.

After the printing operation on the first side by the print head 8 is completed and the rear end of the printing medium S passes the flapper 11, the print controller 202 conveys the printing medium S into the inside of the printing apparatus 1 by reversely rotating the conveyance roller 7. As this time, the flapper 11 is controlled so that the front end thereof inclines to the left side by an actuator, not shown schematically, and therefore, the front end (rear end in the printing operation on the first side) of the printing medium S passes the right side of the flapper 11 and is conveyed in the vertically downward direction. FIG. 6A shows the state where the front end (rear end in the printing operation on the first side) of the printing medium S passes the right side of the flapper 11.

Figure 6B:
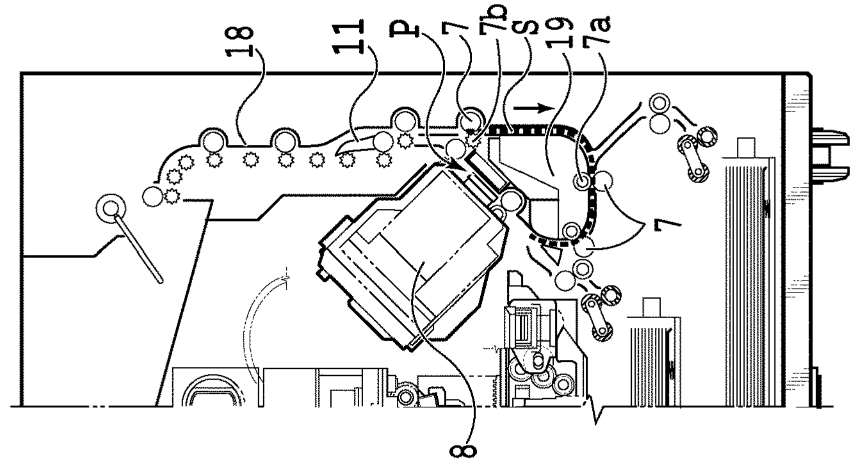

After this, the printing medium S is conveyed along the curved outer circumferential surface of the inner guide 19 and conveyed to the printing area P between the print head 8 and the platen 9 again. At this time, the second side of the printing medium S faces the ejection port surface 8*a* of the print head 8. FIG. 6B shows the conveyance state immediately before the front end of the printing medium S reaches the printing area P for the printing operation on the second side.

Figure 6C:
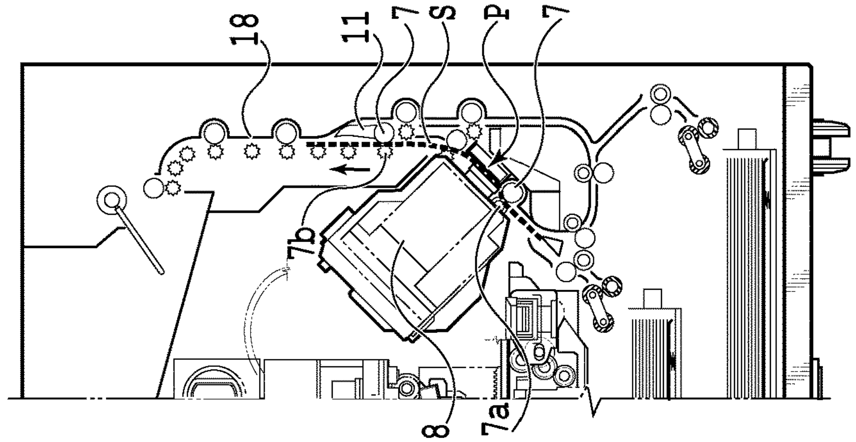
Figure 6D:
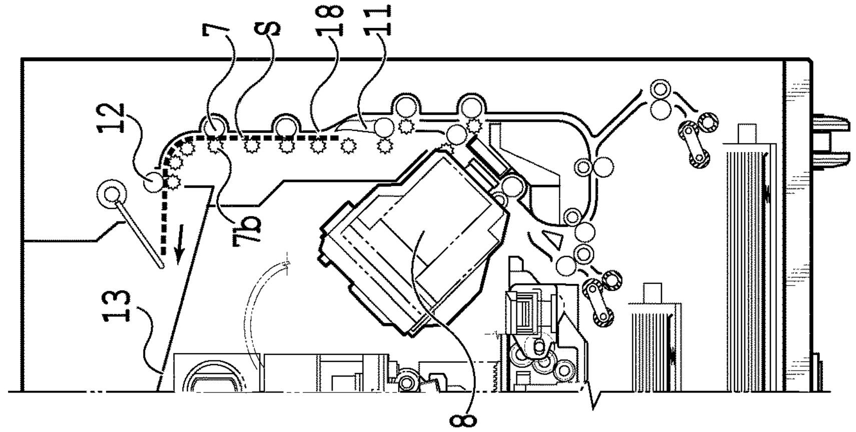

The conveyance path after this is the same as in the case where the first side is printed shown in FIG. 4B and FIG. 4C. FIG. 6C shows the state where the front end of the printing medium S passes the printing area P and is conveyed in the vertically upward direction. At this time, the flapper 11 is controlled so as to move to the position where the front end inclines to the right by an actuator, not shown schematically. FIG. 6D shows the state where the front end of the printing medium S passes the discharge roller 12 and is discharged to the discharge tray 13.

About Maintenance Operation for Print Head

Next, the maintenance operation for the print head 8 is explained. As also explained in FIG. 1, the maintenance unit 16 includes the cap unit 10 and the wiping unit 17 and performs the maintenance operation by causing these units to operate at predetermined timing.

Figure 7:
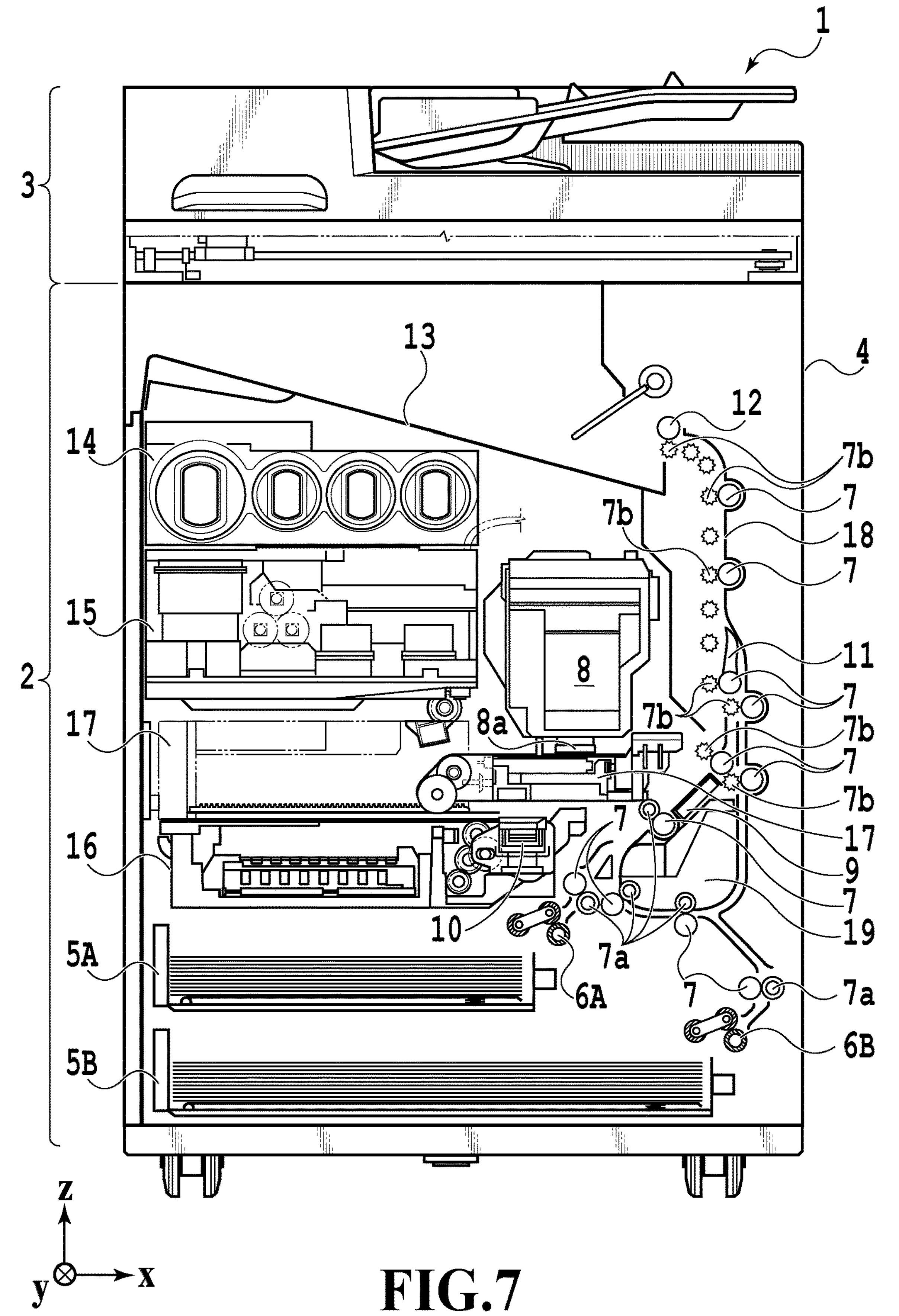
FIG. 7 is a diagram in the case where the printing apparatus is in a maintenance state.

FIG. 7 is the diagram in the case where the printing apparatus 1 is in the maintenance state. At the time of moving the print head 8 from the standby position shown in FIG. 1 to the maintenance position shown in FIG. 7, the print controller 202 moves the cap unit 10 in the vertically downward direction as well as moving the print head 8 upward in the vertical direction. Then, the print controller 202 moves the wiping unit 17 in the rightward direction in FIG. 7 from the evacuate position. After this, the print controller 202 moves the print head 8 in the vertically downward direction and moves the print head 8 to the maintenance position where the maintenance operation can be performed.

On the other hand, at the time of moving the print head 8 from the printing position shown in FIG. 3 to the maintenance position shown in FIG. 7, the print controller 202 moves the print head 8 in the vertically upward direction while rotating the print head 8 by 45 degrees. Then, the print controller 202 moves the wiping unit 17 in the rightward direction from the evacuate position. After this, the print controller 202 moves the print head 8 in the vertically downward direction and moves the print head 8 to the maintenance position where the maintenance operation by the maintenance unit 16 can be performed.

Figure 8A:
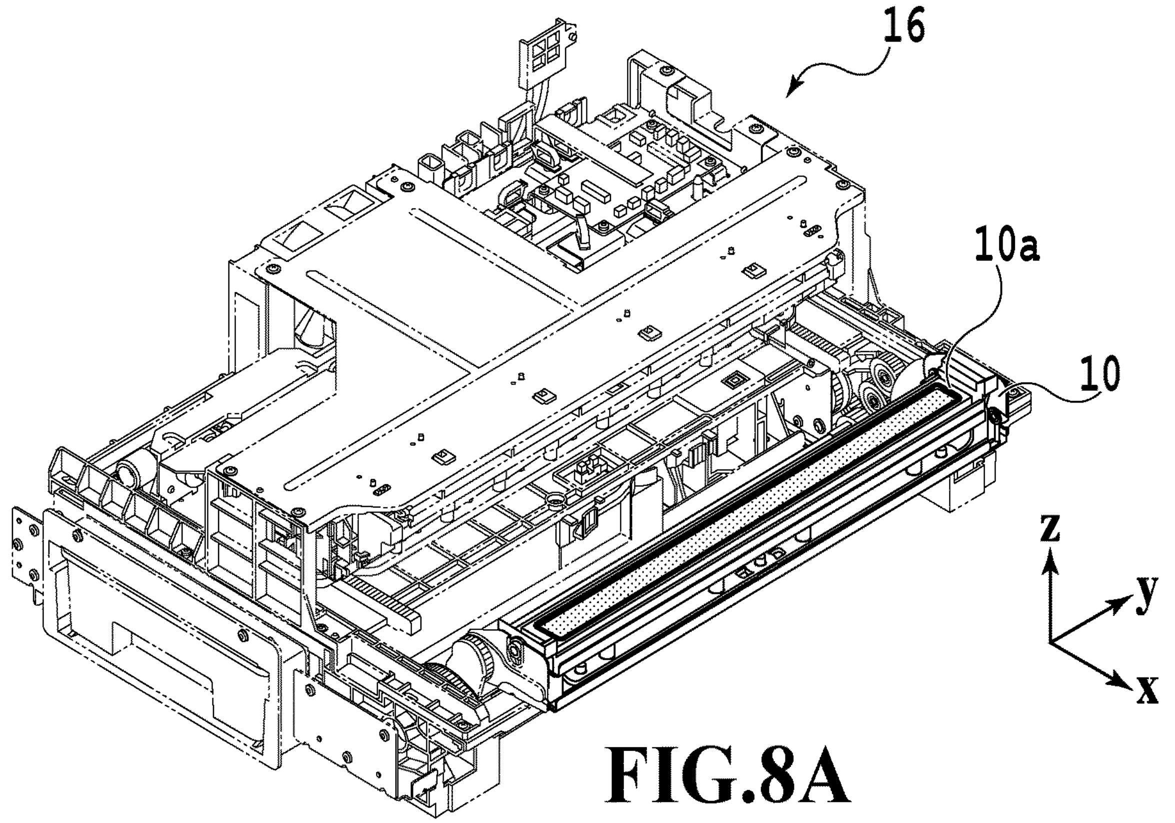
FIG. 8A and FIG. 8B are perspective diagrams showing a configuration of a maintenance unit.
Figure 8B:
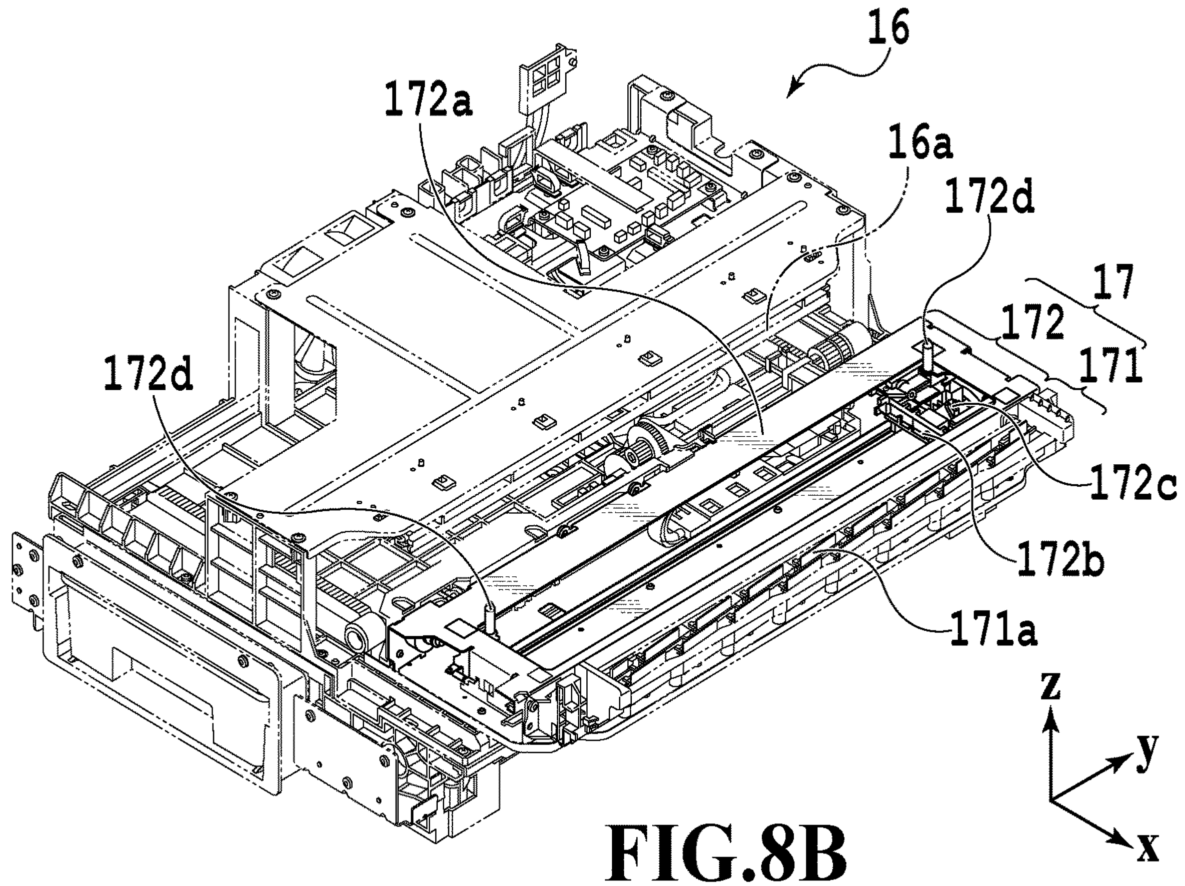

FIG. 8A is a perspective diagram showing a state where the maintenance unit 16 is at the standby position and FIG. 8B is a perspective diagram showing a state where the maintenance unit 16 is at the maintenance position. FIG. 8A corresponds to FIG. 1 and FIG. 8B corresponds to FIG. 7. In the case where the print head 8 is at the standby position, the maintenance unit 16 is at the standby position shown in FIG. 8A and the cap unit 10 has moved in the vertically upward direction and the wiping unit 17 is stored inside the maintenance unit 16. The cap unit 10 has the box-shaped cap member 10*a* extending in the y-direction and by causing the cap member 10*a* to adhere closely to the ejection port surface 8*a* of the print head 8, it is possible to suppress evaporation of ink from the ejection port. In the cap member 10*a*, an absorbent capable of absorbing and storing a predetermined amount of ink is arranged. Further, the cap unit 10 also includes a function to recover ink ejected by preparatory ejection (hereinafter, abbreviated to preliminary ejection) and the like to the cap member 10*a* and to cause a suction pump, not shown schematically, to suck the recovered ink (cap suction).

On the other hand, at the maintenance position shown in FIG. 8B, the cap unit 10 has moved in the vertically downward direction and the wiping unit 17 is pulled out from the maintenance unit 16. The wiping unit 17 includes two wiper units: a blade wiper unit 171 and a vacuum wiper unit 172.

In the blade wiper unit 171, the number of blade wipers 171*a* for wiping the ejection port surface 8*a* along the x-direction are arranged in the y-direction so as to cover a length corresponding to an array area of the ejection port. At the time of performing the wiping operation by using the blade wiper unit 171, the wiping unit 17 moves the blade wiper unit 171 in the x-direction in the state of being positioned at a height where the print head 8 is capable of coming into contact with the blade wiper 171*a*. By this movement, the ink or the like attached to the ejection port surface 8*a* is wiped off by the blade wiper 171*a*.

At the entrance of the maintenance unit 16 at the time of the blade wiper 171*a* being stored, a wet wiper cleaner 16*a* for giving a wet liquid to the blade wiper 171*a* as well as removing ink attached to the blade wiper 171*a* is arranged. Each time the blade wiper 171*a* is stored in the maintenance unit 16, the attached matter is removed by the wet wiper cleaner 16*a* and a wet liquid is applied. Then, at the time of wiping the ejection port surface 8*a* next, the wet liquid is transferred to the ejection port surface 8*a* and thereby smoothness between the ejection port surface 8*a* and the blade wiper 171*a* is improved.

On the other hand, the vacuum wiper unit 172 has a flat plate 172*a* having an opening extending in the y-direction, a carriage 172*b* capable of moving within the opening in the y-direction, and a vacuum wiper 172*c* mounted on the carriage 172*b*. The vacuum wiper 172*c* is arranged so as to be capable of wiping the ejection port surface 8*a* in the y-direction accompanying the movement of the carriage 172*b*. At the front end of the vacuum wiper 172*c*, a suction port connected to a suction pump, not shown schematically, is formed. Because of this, in the case where the carriage 172*b* is moved in the y-direction while causing the suction pump to operate, the ink or the like attached to the ejection port surface 8*a* of the print head 8 is sucked into the suction port while being wiped and collected by the vacuum wiper 172*c*. At this time, a positioning pin 172*d* provided at both ends of the flat plate 172*a* and the opening is made use of for positioning the ejection port surface 8*a* with respect to the vacuum wiper 172*c*.

It is possible for the wiping unit 17 to perform first wiping processing to perform the wiping operation by the blade wiper unit 171 but not to perform the wiping operation by the vacuum wiper unit 172 and second wiping processing to perform both pieces of wiping processing in order. At the time of performing the first wiping processing, the print controller 202 first pulls out the wiping unit 17 from the maintenance unit 16 in the state where the print head 8 is evacuated in the vertically upward direction from the maintenance position in FIG. 7. Then, the print controller 202 moves the wiping unit 17 into the maintenance unit 16 after moving the print head 8 in the vertically downward direction down to the position at which the print head 8 is capable of coming into contact with the blade wiper 171*a*. By this movement, the ink or the like attached to the ejection port surface 8*a* is wiped off by the blade wiper 171*a*. That is, the blade wiper 171*a* wipes the ejection port surface 8*a* at the time of moving from the position where the blade wiper 171*a* is pulled out from the maintenance unit 16 into the maintenance unit 16.

After the blade wiper unit 171 is stored, next, the print controller 202 moves the cap unit 10 in the vertically upward direction and causes the cap member 10*a* to adhere closely to the ejection port surface 8*a* of the print head 8. Then, the print controller 202 drives the print head 8 in this state and causes the print head 8 to perform preliminary ejection and sucks the ink recovered within the cap member 10*a* by the suction pump.

On the other hand, at the time of performing the second wiping processing, first, the print controller 202 pulls out the wiping unit 17 from the maintenance unit 16 by sliding the wiping unit 17 in the state where the print head 8 is evacuated in the vertically upward direction from the maintenance position in FIG. 7. Then, the print controller 202 moves the wiping unit 17 into the maintenance unit 16 after moving the print head 8 in the vertically downward direction down to the position where the print head 8 is capable of coming into contact with the blade wiper 171*a*. Due to this, the wiping operation by the blade wiper 171*a* is performed for the ejection port surface 8*a*. Next, the print controller 202 pulls out the wiping unit 17 from the maintenance unit 16 by sliding the wiping unit 17 up to a predetermined position in the state where the print head 8 is evacuated in the vertically upward direction from the maintenance position in FIG. 7 again. Following the above, the print controller 202 performs positioning of the ejection port surface 8*a* and the vacuum wiper unit 172 by using the flat plate 172*a* and the positioning pin 172*d* while lowering the print head 8 down to the wiping position shown in FIG. 7. After this, the print controller 202 performs the wiping operation by the above-described vacuum wiper unit 172. After evacuating the print head 8 in the vertically upward direction and storing the wiping unit 17, the print controller 202 performs preliminary ejection into the cap member by the cap unit 10 and the suction operation of recovered ink as in the first wiping processing.

About Ink Supply Unit

Figure 9:
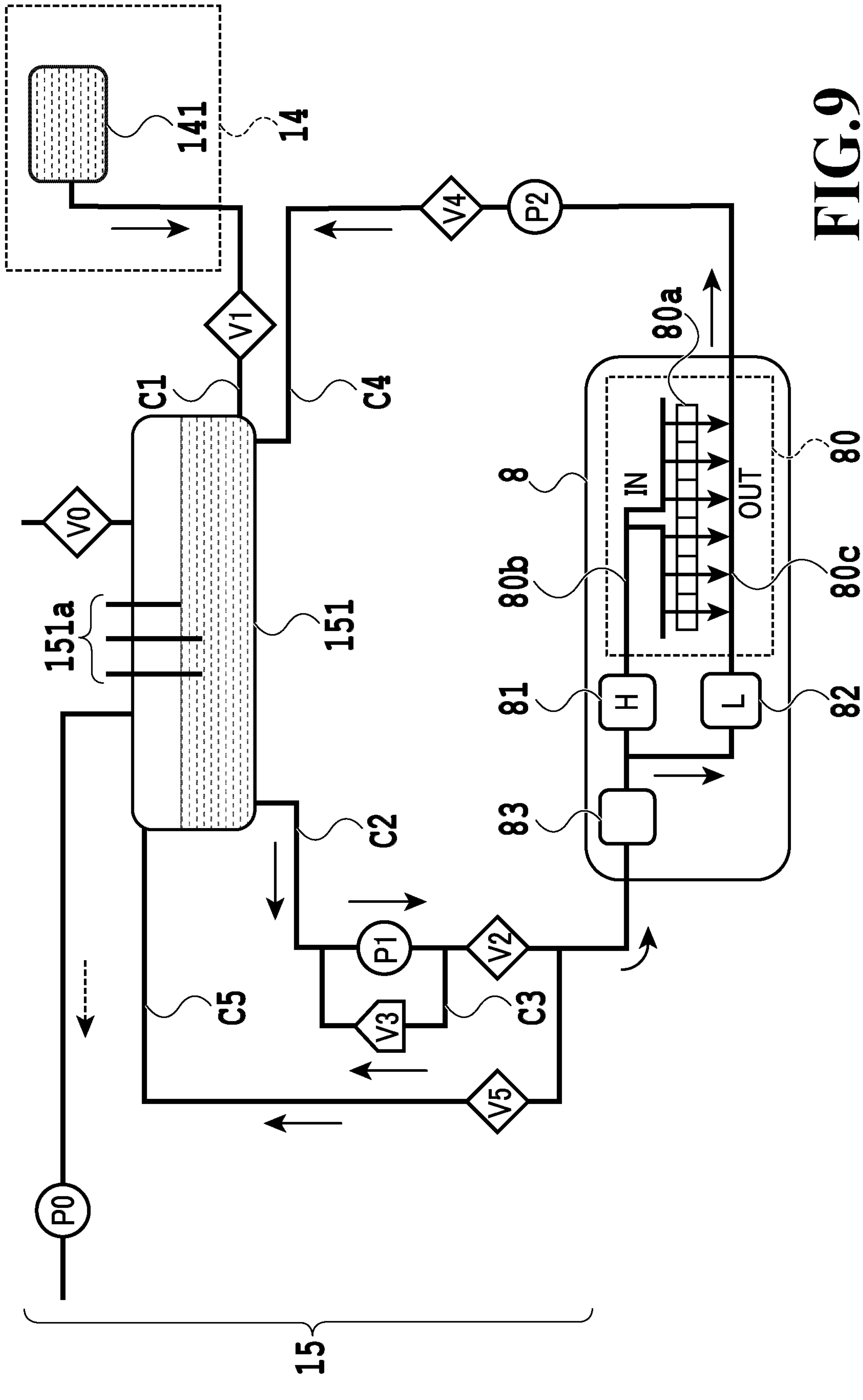
FIG. 9 is a diagram showing an ink supply unit.

FIG. 9 is a diagram showing the ink supply unit 15 adopted in the ink jet printing apparatus 1 of the present embodiment. The ink supply unit 15 has a configuration in which ink is supplied from the ink tank unit 14 to the print head 8. Here, the configuration of one color ink is shown, but in fact, such a configuration is prepared for each ink color. The ink supply unit 15 is controlled basically by the ink supply control unit 209 shown in FIG. 2. In the following, the configuration of each of the units is explained.

Ink circulates mainly between a sub tank 151 and the print head 8 (head unit in FIG. 9). In the head unit 8, the ejection operation of ink is performed based on image data and the ink not ejected is recovered again to the sub tank 151.

The sub tank 151, which stores a predetermined amount of ink, is connected to a supply flow path C2 for supplying ink to the head unit 8 and a recovery flow path for recovering ink from the head unit 8. That is, the circulation path through which ink circulates is made up of the sub tank 151, the supply flow path C2, the head unit 8, and the recovery flow path C4.

In the sub tank 151, a liquid surface detection unit 151*a* including a plurality of pins is provided, and it is possible for the ink supply control unit 209 to determine the height of the ink liquid surface. That is, the amount of ink remaining within the sub tank 151 is determined by detecting whether or not a current is conducted between the plurality of pins. A decompression pump P0 is a negative pressure generation source for reducing the pressure inside the sub tank 151. An atmosphere open valve V0 is a valve for switching between the inside of the sub tank 151 communicating with the atmosphere and a condition where the inside of the sub tank 151 is not in communication with the atmosphere.

A main tank 141 is a tank storing ink that is supplied to the sub tank 151. The main tank 141 is made up of a flexible member and the sub tank 151 is filled with ink by a change in volume of the flexible member. The main tank 141 is configured to be attachable to and detachable from the printing apparatus main body. A tank supply valve V1 for switching connections of the sub tank 151 and the main tank 141 is arranged in the tank connection flow path C1, which connects the sub tank 151 and the main tank 141.

With the above configuration, in the case of detecting that the ink within the sub tank 151 becomes smaller than a predetermined amount by the liquid surface detection unit 151*a*, the ink supply control unit 209 closes the atmosphere open valve V0, a supply valve V2, a recovery valve V4, and a head exchange valve V5 and opens the tank supply valve V1. In this state, the ink supply control unit 209 causes the decompression pump P0 to operate. Then, the pressure inside the sub tank 151 becomes negative and ink is supplied from the main tank 141 to the sub tank 151. In the case of detecting that the ink within the sub tank 151 exceeds a predetermined amount by the liquid surface detection unit 151*a*, the ink supply control unit 209 closes the tank supply valve V1 and stops the decompression pump P0.

The supply flow path C2 is a flow path for supplying ink from the sub tank 151 to the head unit 8 and on the way thereof, a supply pump P1 and the supply valve V2 are arranged. During the printing operation, by driving the supply pump P1 in the state where the supply valve V2 is open, it is possible to circulate ink in the circulation path while supplying ink to the head unit 8. The amount of ink ejected per unit time by the head unit 8 fluctuates in accordance with image data. The amount of flow of the supply pump P1 is determined so as to be compatible also with the case where the head unit 8 performs the ejection operation that maximizes the amount of ink to be ejected per unit time.

A relief flow path C3 is a flow path that is located on the upstream side of the supply valve V2 and which connects the upstream side and the downstream side of the supply pump P1. A relief valve V3, which is a differential pressure valve, is arranged in the relief flow path C3. In the case where the ink supply amount per unit time from the supply pump P1 is larger than the total value of the ejection amount per unit time of the head unit 8 and the flow amount (amount of ink to be drawn) per unit time in the recovery pump P2, the relief valve V3 is opened in accordance with the pressure that is exerted on the relief valve V3 itself. Due to this, a circulation path made up of a part of the supply flow path C2 and the relief flow path C3 is formed. By providing the configuration of the above-described relief flow path C3, the ink supply amount for the head unit 8 is adjusted in accordance with the ink ejection amount in the head unit 8, and therefore, it is possible to stabilize the flow pressure within the circulation path irrespective of image data.

The recovery flow path C4 is a flow path for recovering ink from the head unit 8 to the sub tank 151. A recovery pump P2 and the recovery valve V4 are arranged in the recovery flow path C4. At the time of circulating ink within the circulation path, the recovery pump P2 functions as a negative pressure generation source to suck ink from the head unit 8. By driving the recovery pump P2, an appropriate pressure difference arises between an IN flow path 80*b* and an OUT flow path 80*c* within the head unit 8, and therefore, it is possible to circulate ink between the IN flow path 80*b* and the OUT flow path 80*c*. The flow path configuration within the head unit 8 will be described later in detail.

The recovery valve V4 is a valve for checking a backflow in the case where the printing operation is not being performed, that is, ink is not being circulated within the circulation path. In the circulation path of the present embodiment, the sub tank 151 is arranged above the head unit 8 in the vertical direction (see FIG. 1). Because of this, in the case where the supply pump P1 and the recovery pump P2 are not driven, there is a possibility that ink flows backward from the sub tank 151 to the head unit 8 due to a difference in pressure head between the sub tank 151 and the head unit 8. In order to check such a backflow, in the present embodiment, the recovery valve V4 is provided in the recovery flow path C4.

Similarly, the supply valve V2 also functions as a valve for checking a backflow of ink from the sub tank 151 to the head unit 8 in the case where the printing operation is not being performed, that is, ink is not being circulated within the circulation path.

A head exchange flow path C5 is a flow path that connects the supply flow path C2 and an air layer (portion where ink is not stored) of the sub tank 151. A head exchange valve V5 is arranged in the head exchange flow path C5. One end of the head exchange flow path C5 is connected to the upstream of the head unit 8 in the supply flow path C2 and the other end is connected to the upper portion of the sub tank 151 and communicates with the air layer inside thereof. The head exchange flow path C5 is used to recover ink from the head unit 8 when exchanging the head unit 8 or transporting the printing apparatus 1. The head exchange valve V5 is controlled by the ink supply control unit 209 to be closed except for the case where the printing apparatus 1 is initially filled with ink and the case where ink is recovered from the head unit 8. Further, the above-described supply valve V2 is provided between the connection portion with the head exchange flow path C5 and the connection portion with the relief flow path C3 in the supply flow path C2.

Next, the flow path configuration within the head unit 8 is explained. The ink supplied to the head unit 8 by the supply flow path C2 is supplied to a first negative pressure control unit 81 configured to generate a weak negative pressure and a second negative pressure control unit 82 configured to generate a strong negative pressure after passing a filter 83. The pressures in the first negative pressure control unit 81 and the second negative pressure control unit 82 are generated in an appropriate range by the drive of the recovery pump P2.

In an ink ejection unit 80, a plurality of printing element substrates 80*a* on which a plurality of ejection portions having an ejection port is arrayed is arranged and a long ejection port row is formed. The common supply flow path 80*b* (IN flow path) for guiding ink supplied by the first negative pressure control unit 81 and the common recovery flow path 80*c* (OUT flow path) for guiding ink supplied by the second negative pressure control unit 82 are also extending in the array direction of the printing element substrate 80*a*. Further, on the individual printing element substrates 80*a*, an individual supply flow path connected with the common supply flow path 80*b* and an individual recovery flow path connected with the common recovery flow path 80*c* are formed. Because of this, on the individual printing element substrates 80*a*, a flow of ink is generated, which flows in from the common supply flow path 80*b* where the negative pressure is relatively weak and flows out to the common recovery flow path 80*c* where the negative pressure is relatively strong. In the case where the ejection operation is performed on the printing element substrate 80*a*, a part of the ink that moves from the common supply flow path 80*b* to the common recovery flow path 80*c* is discharged by being ejected from the ejection port, but the ink that is not ejected moves to the recovery flow path C4 via the common recovery flow path 80*c*.

With the above configuration, in the case where the printing operation is performed, the ink supply control unit 209 closes the tank supply valve V1 and the head exchange valve V5, opens the atmosphere open valve V0, the supply valve V2, and the recovery valve V4, and drives the supply pump P1 and the recovery pump P2. Due to this, a circulation path of the sub tank 151 the supply flow path C2 the head unit 8 the recovery flow path C4 the sub tank 151 is established. In the case where the ink supply amount per unit time from the supply pump P1 is larger than the total value of the ejection amount per unit time of the head unit 8 and the flow amount per unit time in the recovery pump P2, ink flows into the relief flow path C3 from the supply flow path C2. Due to this, the flow amount of the ink that flows into the head unit 8 from the supply flow path C2 is adjusted.

In the case where the printing operation is not being performed, the ink supply control unit 209 stops the supply pump P1 and the recovery pump P2 and closes the atmosphere open valve V0, the supply valve V2, and the recovery valve V4. Due to this, the flow of ink within the head unit 8 stops and a backflow due to the water head difference between the sub tank 151 and the head unit 8 is suppressed. Further, by closing the atmosphere open valve V0, leakage of ink and evaporation of ink from the sub tank 151 are suppressed.

In the case of recovering ink from the head unit 8, the ink supply control unit 209 closes the tank supply valve V1, the supply valve V2, and the recovery valve V4, opens the atmosphere open valve V0 and the head exchange valve V5, and drives the decompression pump P0. Due to this, the inside of the sub tank 151 enters a negative pressure state and the ink within the head unit 8 is recovered to the sub tank 151 via the head exchange flow path C5. As described above, the head exchange valve V5 is a valve that is closed in the normal printing operation and at the time of standby and opened at the time of recovering ink from the head unit 8. However, the head exchange valve V5 is also opened at the time of filling the head exchange flow path C5 with ink in the case where the head unit 8 is filled initially.

About Ejection Portion

Figure 10A:
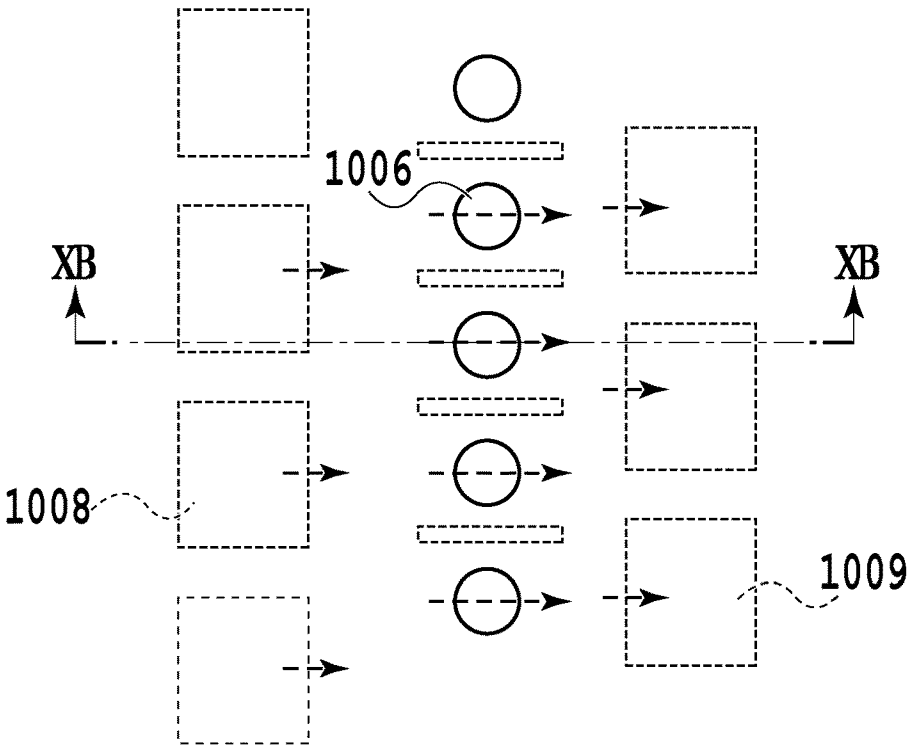
FIG. 10A and FIG. 10B are diagrams showing a configuration of an ejection portion of a printing element substrate.
Figure 10B:
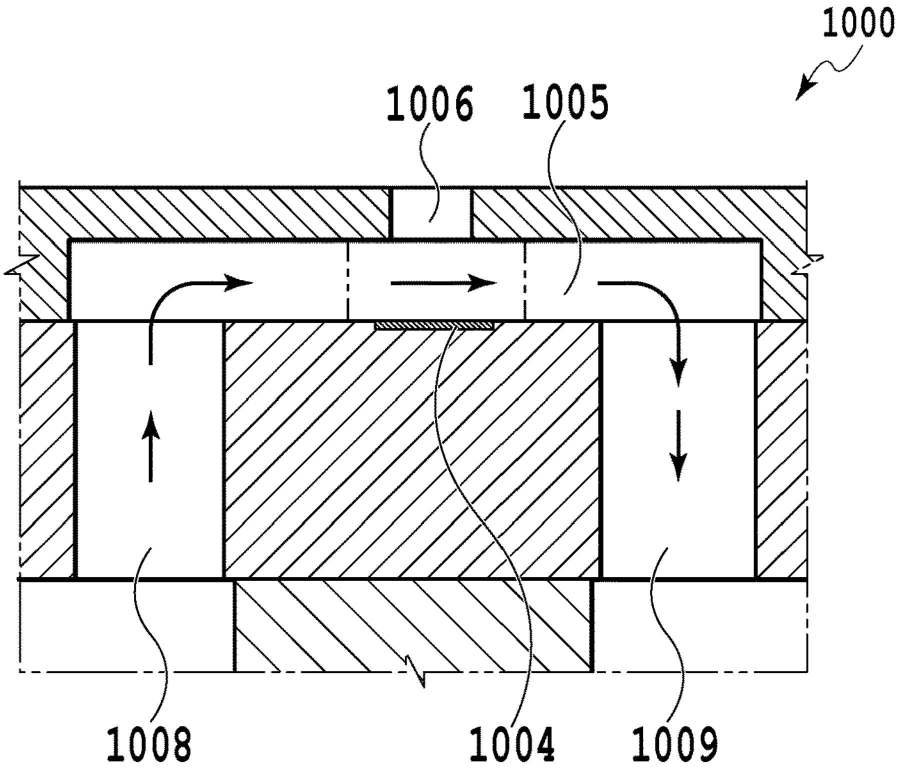

FIG. 10A is a planar schematic diagram in which a part of the printing element substrate 80*a* is enlarged and FIG. 10B is a sectional schematic diagram at a section line XB-XB in FIG. 10A. On the printing element substrate 80*a*, a pressure chamber 1005 filled with ink and an ejection port 1006 that ejects ink are provided. In the pressure chamber 1005, at the position facing the ejection port 1006, a printing element 1004 is provided. Further, on the printing element substrate 80*a*, an individual supply flow path 1008 connected with the common supply flow path 80*b* and an individual recovery flow path 1009 connected with the common recovery flow path 80*c* are formed in plurality, respectively, for each ejection port 1006.

With the above-described configuration, on the printing element substrate 80*a*, a flow of ink is generated, which flows in from the common supply flow path 80*b* where the negative pressure is relatively weak (pressures is high) and flows out to the common recovery flow path 80*c* where the negative pressure is relatively strong (pressure is low). In more detail, ink flows in the order of the common supply flow path 80*b*→the individual supply flow path 1008→the pressure chamber 1005→the individual recovery flow path 1009→the common recovery flow path 80*c*. In the case where ink is ejected by the printing element 1004, part of the ink moving from the common supply flow path 80*b* to the common recovery flow path 80*c* is discharged to the outside of the head unit 8 by being ejected from the ejection port 1006. On the other hand, the ink that is not ejected from the ejection port 1006 is recovered to the recovery flow path C4 through the common recovery flow path 80*c*.

About Preliminary Ejection

Preliminary ejection is an operation for discharging inks whose colors are mixed by being pushed into the ejection port by the wiping processing at a position having no relation with printing. The preliminary ejection is performed after the first wiping processing or the second wiping processing described above is performed. The reason is that the ejection port rows are sequentially wiped off in the wiping processing, and therefore, in the series of wiping operation, the ink wiped off at the ejection port row in the front tier is attached to the ejection port row in the next tier at the time of wiping off the ejection port row in the next tier and thereby mixed-color inks remain. Consequently, after the wiping processing, the preliminary ejection is performed for the cap member 10*a*. Due to this preliminary ejection, the inks whose colors are mixed within the ejection port are discharged.

In the following, with the basic configuration explained hitherto in mind, preferred embodiments of the present invention are explained.

First Embodiment

The present embodiment supposes the case where (the ejection port surface of) the print head is capped by a cap mechanism for a long time. In such a cap closed state, although the progress speed is slow compared to that in the cap open state, evaporation of ink progresses. Consequently, even in the cap closed state, in the case where evaporation of ink progresses over a long elapsed time, there is a possibility that it becomes difficult to eject ink from the ejection portion because concentrated ink remains stagnant at the ejection port. Consequently, in the present embodiment, the inside of the print head is kept in a printable state by circulating ink in the case where a predetermined time elapses in the cap closed state.

About Timer Circulation Processing

Figure 11:
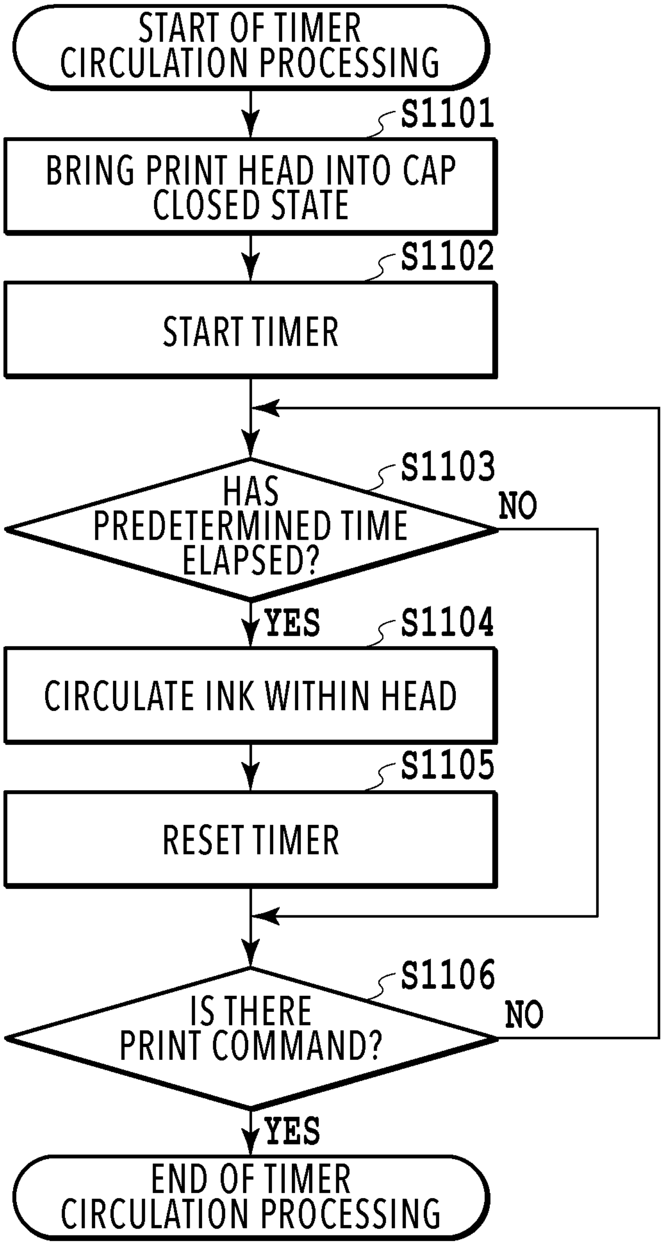
FIG. 11 is a flowchart of timer circulation processing in a first embodiment.

In the following, processing (referred to as timer circulation processing) to circulate ink in the case where a predetermined time elapses by counting time by a timer is explained by using FIG. 11. The following processing is started in the state where the printing apparatus 1 is in the cap open state, that is, in the state where the ejection port surface 8*a* is not capped by the cap unit 10 (for example, the state in FIG. 3).

At step S1101, the print controller 202 causes the print head 8 to make a transition from the cap open state into the cap closed state by controlling the maintenance control unit 210 to move the cap unit 10 that is not capping the ejection port surface 8*a*.

At step S1102, the print controller 202 starts a timer in the cap closed state. This timer is a timer that the printing apparatus 1 includes and counts the continuation time of the cap closed state (referred to as capping time). It is possible for the print controller 202 to acquire the capping time at any timing.

At step S1103, the print controller 202 determines whether a predetermined time (for example, six hours) has elapsed, that is, whether the counter started at step S1102 has counted a predetermined time. In the case where the determination results at step S1103 are affirmative, the processing advances to step 1104 and on the other hand, in the case where the determination results are negative, the processing advances to step S1106.

Figure 12:
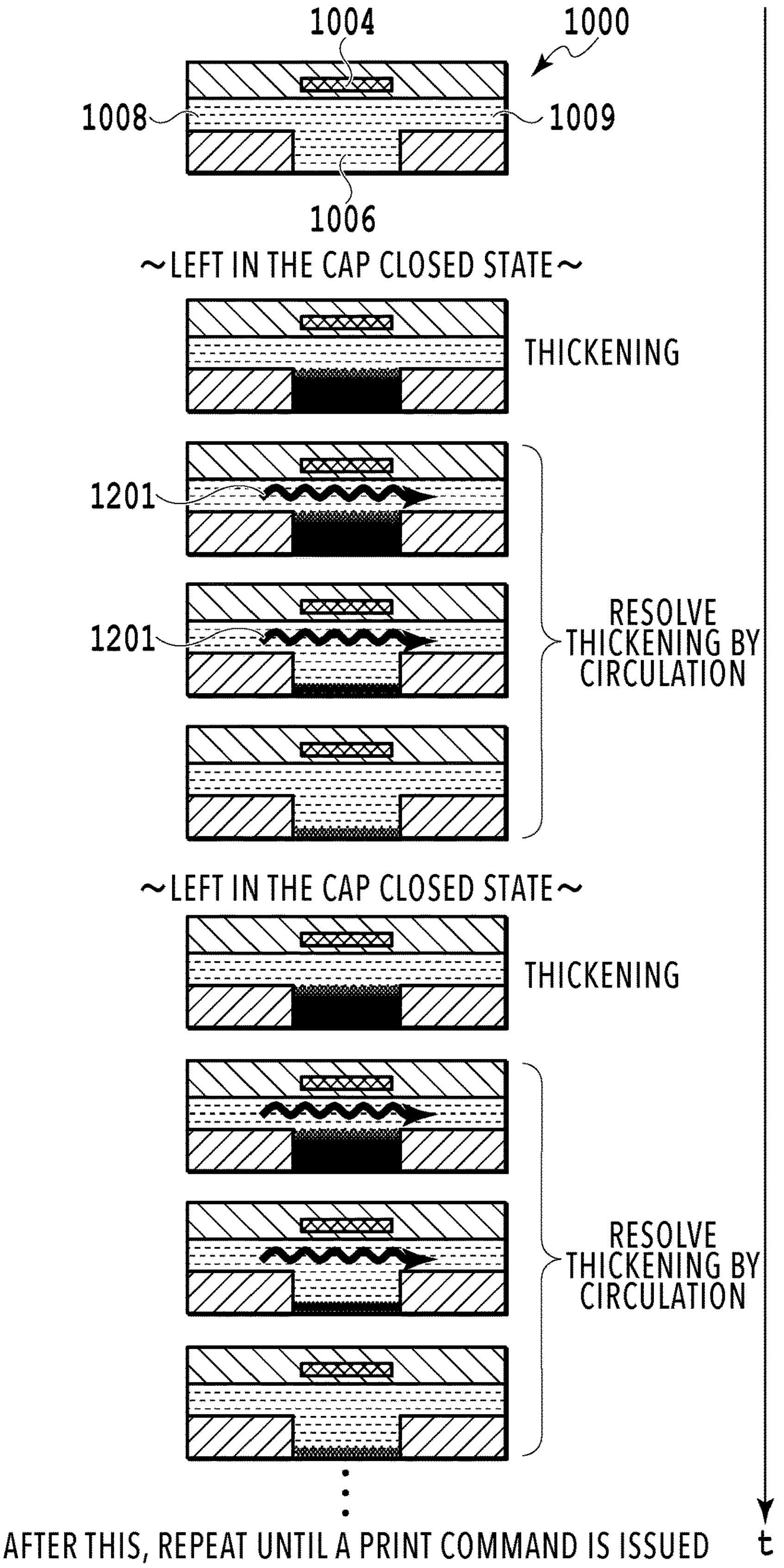
FIG. 12 is an explanatory diagram of the timer circulation processing in the first embodiment.

At step S1104, the print controller 202 circulates ink within the above-described circulation path by controlling the ink supply control unit 209. Due to this, an ink flow occurs at the ejection portion 1000 within the print head 8. FIG. 12 shows the way the thickened ink remaining stagnant within the ejection port 1006 flows out from the individual recovery flow path 1009 due to an ink flow 1201 that has occurred at this step. The vertical axis corresponds to the time axis and indicates an elapse of time from top to bottom in FIG. 12. As shown in FIG. 12, due to an ink flow 1201 that occurs each time a predetermined time elapses, the ink remaining stagnant within the ejection port 1006 is diffused and the inside of the ejection port 1006 is filled with fresh ink. As a result of this, ejection stability (characteristics of being capable of stably ejecting ink from the ejection port) of the ejection portion 1000 (at the ejection port 1006) is restored.

At step S1105, the print controller 202 resets the timer.

At step S1106, the print controller 202 determines whether there is a print command. In the case where the determination results are affirmative, the timer circulation processing is terminated. In the case where the determination results at step S1106 are negative, the processing returns to step S1103 and the timer circulation processing is continued. The above is the contents of the timer circulation processing in the present embodiment.

About Effect of the Present Embodiment

By the present embodiment, it is made possible to prevent the ejection port 1006 from being clogged by concentrated ink and to secure ejection stability of the ejection portion 1000 in the case where the print head 8 is capped by the cap unit 10 for a long time.

Second Embodiment

In the present embodiment, a case is explained where the time intervals (referred to as circulation intervals) at which ink is circulated are changed based on the installation environment of the printing apparatus 1, specifically, in accordance with temperature and humidity. The circulation interval is a time interval between a previous circulation operation and a following circulation operation. The following discussion will describe differences from the already-described embodiment and an explanation of the same features as those of the already-described embodiment is omitted.

About Timer Circulation Processing

Figure 13A:
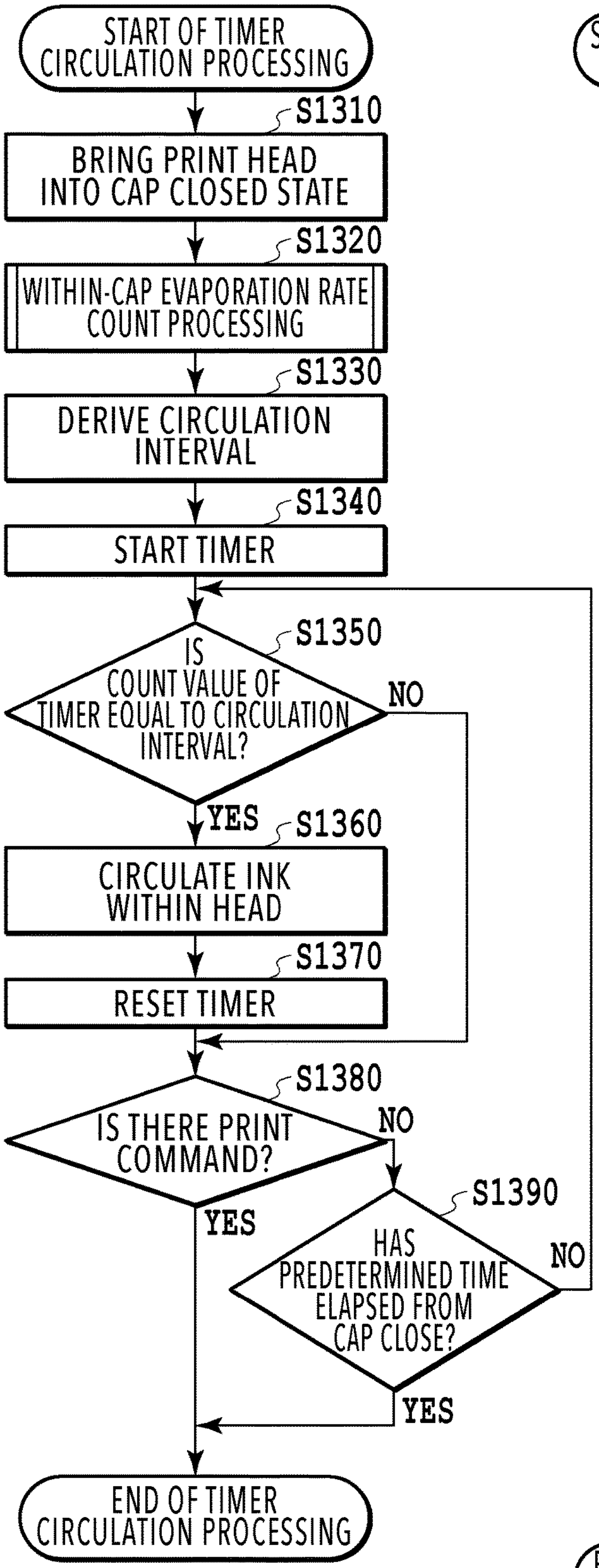
FIG. 13A and FIG. 13B are flowcharts of timer circulation processing in a second embodiment.

In the following, timer circulation processing in the present embodiment is explained by using FIG. 13A.

At step S1310, the print controller 202 causes the print head 8 to make a transition from the cap open state into the cap closed state by controlling the maintenance control unit 210 to move the cap unit 10 that is not capping the ejection port surface 8*a*.

At step S1320, the print controller 202 performs processing (referred to as within-cap evaporation rate count processing) to count an evaporation rate of ink within the cap unit 10. Details of the within-cap evaporation rate count processing will be described later by using FIG. 13B.

At step S1330, the print controller 202 determines a circulation interval. Specifically, the print controller 202 functions as a circulation interval determination unit and determines the value of the circulation interval corresponding to the within-cap evaporation rate count value acquired at step S1320 by referring to a table as shown in FIG. 14A. In the case where the table shown in FIG. 14A is used, for example, on a condition that the within-cap evaporation rate count value is 200, the circulation interval is 18 hours. The table in FIG. 14A is merely exemplary and it may also be possible to use another table holding a value range of the within-cap evaporation rate count and values of the circulation interval corresponding thereto. However, in such a table, generally, the larger the within-cap evaporation rate count value, the shorter the circulation interval is set. The reason is that the larger the within-cap evaporation rate count value, the more the evaporation of ink progresses, and therefore, the ink is apt to thicken and it is necessary to perform circulation of the ink more frequently. Here, the case where a table is used is explained, but it may also be possible to calculate the circulation interval by using a mathematical expression in which a within-cap evaporation rate count value is substituted in place of using a table.

At step S1340, the print controller 202 starts the timer that counts the capping time.

At step S1350, the print controller 202 determines whether the count value of the timer that starts at step S1340 has reached the circulation interval determined at step S1330. In the case where the determination results at step S1350 are affirmative, the processing advances to step S1360 and on the other hand, in the case where the determination results are negative, the processing advances to step S1380.

The processing at step S1360 is the same as the processing at step S1104 and the processing at step S1370 is the same as the processing at step S1105. After step S1370, the processing advances to step S1380.

At step S1380, the print controller 202 determines whether there is a print command. In the case where the determination results are affirmative, the timer circulation processing is terminated and on the other hand, in the case where the determination results are negative, the processing advances to step S1390.

At step S1390, the print controller 202 determines whether a predetermined time (for example, one week) has elapsed after the cap close at step S1310. This step is processing performed for terminating the timer circulation processing in the case where it is expected that the printing apparatus 1 is not used for a long time and the necessity to keep the inside of the print head 8 in a printable state is not so urgent. The processing at this step may be performed in the flow of the first embodiment. In the case where the determination results at step S1390 are affirmative, the timer circulation processing is terminated and on the other hand, in the case where the determination results are negative, the processing returns to step S1350 and the timer circulation processing is continued. The above is the contents of the timer circulation processing in the present embodiment.

About Within-Cap Evaporation Rate Count Processing

Figure 13B:
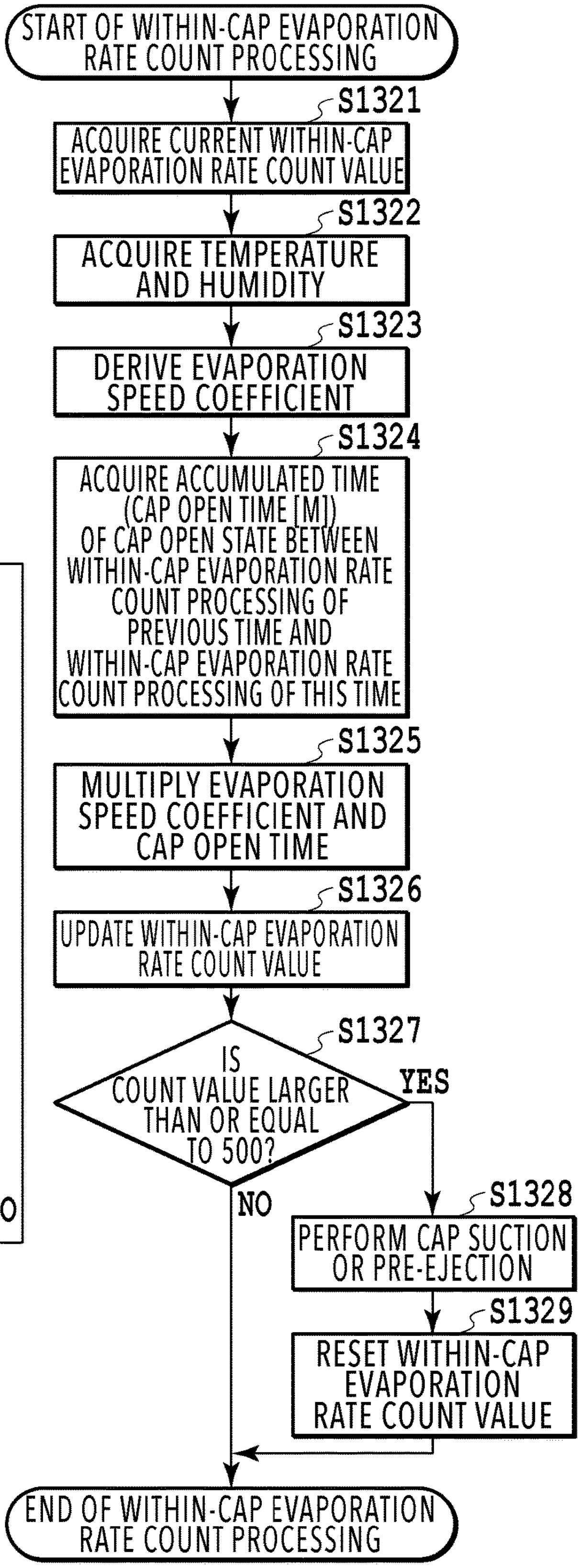

In the following, the above-described within-cap evaporation rate count processing (step S1320) is explained in detail by using FIG. 13B.

At step S1321, the print controller 202 acquires the current within-cap evaporation rate count value. Here, the within-cap evaporation rate is a parameter indicating the degree of the progress of evaporation of ink within the ejection portion 1000 capped by the cap unit 10 and is counted by the print controller 202. The current within-cap evaporation rate count value is stored in the ROM 203.

At step S1322, the print controller 202 acquires temperature and humidity of the installation environment of the printing apparatus 1. The printing apparatus 1 includes a thermometer and a hygrometer and it is possible for the print controller 202 to acquire temperature and humidity of the installation environment of the printing apparatus 1 at any timing.

At step S1323, the print controller 202 calculates an evaporation speed coefficient corresponding to the temperature and humidity acquired at step S1322. In the following, a derivation method of the evaporation speed coefficient is explained in detail.

First, based on the temperature and humidity acquired at step S1322, the state of the installation environment (referred to as temperature and humidity state) is classified by using a graph as illustrated in FIG. 14B. In the case where the graph shown in FIG. 14B is used, the temperature and humidity state is classified into one of a first temperature and humidity state 1401, a second temperature and humidity state 1402, and a third temperature and humidity state 1403. The first temperature and humidity state 1401 is a low-temperature and high-humidity state, that is, a state where ink does not concentrate easily. The third temperature and humidity state 1403 is a high-temperature and low-humidity state, that is, a state where ink concentrates easily. The second temperature and humidity state 1402 is an intermediate state between the first temperature and humidity state 1401 and the third temperature and humidity state 1403.

Next, by referring to a table as illustrated in FIG. 14C, the evaporation speed coefficient corresponding to the temperature and humidity state classified above is calculated. As shown in FIG. 14C, for the state where ink concentrates more easily, the evaporation speed coefficient is larger. The graph shown in FIG. 14B and the table shown in FIG. 14C are merely exemplary and another graph or another table may be used. The graph for classifying the temperature and humidity state based on temperature and humidity and the table holding the evaporation speed coefficient for each temperature and humidity state as described above are stored in advance in the ROM 203 and it is possible for the print controller 202 to use those at any timing.

At step S1324, the print controller 202 acquires an accumulated time (m) of the cap open state (referred to as cap open time) between the within-cap evaporation rate count processing of the previous time and the within-cap evaporation rate count processing of this time. The printing apparatus 1 includes a timer that counts the cap open time and it is possible for the print controller 202 to acquire the cap open time at any timing.

At step S1325, the print controller 202 multiplies the evaporation speed coefficient calculated at step S1323 and the cap open time acquired at step S1324. Then, the value obtained by the multiplication is added to the current within-cap evaporation rate count value acquired at step S1321.

At step S1326, the print controller 202 updates the within-cap evaporation rate count value, specifically, overwrites the within-cap evaporation rate count value stored in the ROM 203 by the value calculated at step S1325 and saves.

At step S1327, the print controller 202 determines whether the within-cap evaporation rate count value is larger than or equal to a predetermined threshold value (in the present embodiment, larger than or equal to 500). The threshold value 500 described here is merely an example and in the case where the table used at step S1330 is changed, the threshold value used at this step is also changed as a matter of course. In the case where the determination results at step S1327 are affirmative, the processing advances to step S1328 and on the other hand, in the case where the determination results are negative, the within-cap evaporation rate count processing is terminated (the processing advances to step S1330).

At step S1328, the print controller 202 drives and causes the printing element 1004 to perform preliminary ejection of ink. Alternatively, it may also be possible for the print controller 202 to perform cap suction by controlling the maintenance control unit 210. In the case where the within-cap evaporation rate count value is larger than or equal to 500 (YES at step S1327), the evaporation of ink has progressed significantly, and therefore, it is difficult to restore ejection stability of the ejection portion 1000 by circulation alone. Consequently, an attempt to restore ejection stability is made by performing preliminary ejection or cap suction at this step.

At step S1329, the print controller 202 resets the within-cap evaporation rate count value (sets to 0). After step S1329, the within-cap evaporation rate count processing is terminated (the processing advances to step S1330). The above is the contents of the within-cap evaporation rate count processing in the present embodiment.

About Modification Example of the Present Embodiment

In the above-described example, the circulation interval is determined based on the temperature and humidity of the printing apparatus 1, but it may also be possible to determine the circulation interval based on one of the temperature and humidity. Further, in the above-described example, the within-cap evaporation rate is reset at step S1329, but it may also be possible to use a method of performing subtraction for the count value according to the amount of preliminary ejection and the intensity of cap suction. Furthermore, in the case where a mechanism capable of deriving ink density information, to be described later in a fourth embodiment, is included, it may also be possible to change the subtraction value of the within-cap evaporation rate in accordance with the density information.

About Effect of the Present Embodiment

By the present embodiment, it is made possible to keep the inside of the print head 8 in a printable state (to secure ejection stability of the ejection portion 1000) by circulating ink with a frequency in accordance with the installation environment, that is, the temperature and humidity of the printing apparatus 1.

Third Embodiment

In the second embodiment, the within-cap evaporation rate is counted by taking into consideration the evaporation of ink in the cap open state. In contrast to this, in the present embodiment, the within-cap evaporation rate is counted also by taking into consideration the evaporation of ink in the cap closed state

About Timer Circulation Processing

In the following, timer circulation processing in the present embodiment is explained by using FIG. 15A.

The processing at step S1510 to step S1560 is the same as the processing at step S1310 to step S1360.

At step S1570, the print controller 202 performs within-cap evaporation rate addition processing while the cap is closed to add the amount of fluctuations in the within-cap evaporation rate due to the evaporation of ink that progresses while the cap is closed to the count value of the within-cap evaporation rate. Details of the within-cap evaporation rate count processing while the cap is closed will be described later by using FIG. 15B.

The processing at step S1590 to step S1600 is the same as the processing at step S1380 to step S1390. However, in the present embodiment, in the case of NO at step S1600, the processing returns to step S1530 and the circulation interval is derived again. As described above, in the present embodiment, the circulation interval is derived each time circulation is performed (step S1560→ . . . →step S1600 NO step S1530), and due to this, it is possible to perform circulation at appropriate intervals.

About Within-Cap Evaporation Rate Addition Processing while Cap is Closed

In the following, the above-described within-cap evaporation rate addition processing while the cap is closed (step S1570) is explained in detail by using FIG. 15B.

At step S1571, the print controller 202 acquires the current within-cap evaporation rate count value.

At step S1572, the print controller 202 acquires the temperature and humidity in the installation environment of the printing apparatus 1.

At step S1573, the print controller 202 calculates an evaporation speed coefficient corresponding to the temperature and humidity acquired at step S1572. In the following, a derivation method of the evaporation speed coefficient is explained in detail.

First, as in the second embodiment, based on the temperature and humidity acquired at step S1572, by using the graph as illustrated in FIG. 14B, the temperature and humidity state of the installation environment is classified.

Next, by referring to a table as illustrated in FIG. 15C, an evaporation speed coefficient corresponding to the temperature and humidity state classified above is calculated. As shown in FIG. 15C, for the state where ink concentrates more easily, the evaporation speed coefficient is larger. However, the cap closed state is a state where evaporation of ink does not progress easily compared to the cap open state, and therefore, all the values of the evaporation speed coefficients held in the table in FIG. 15C are smaller than the values of the evaporation speed coefficients held in the table in FIG. 14C. The table shown in FIG. 15C is merely exemplary and it may be possible to use another table.

At step S1574, the print controller 202 acquires a capping time.

At step S1575, the print controller 202 multiplies the evaporation speed coefficient calculated at step S1573 and the capping time acquired at step S1574. Then, the value obtained by the multiplication is added to the current within-cap evaporation rate count value acquired at step S1571.

At step S1576, the print controller 202 updates the within-cap evaporation rate count value, specifically, overwrites the within-cap evaporation rate count value stored in the ROM 203 by the value calculated at step S1575 and saves.

The processing at step S1577 to step S1579 is the same as the processing at step S1327 to step S1329. The above is the contents of the within-cap evaporation rate addition processing while the cap is closed in the present embodiment.

About Effect of the Present Embodiment

In the present embodiment, the within-cap evaporation rate is counted by also taking into consideration the evaporation of ink in the cap closed state, in addition to the evaporation of ink in the cap open state. Consequently, it is made possible to keep the inside of the print head 8 in a printable state (to secure ejection stability of the ejection portion 1000) by circulating ink with a more appropriate frequency than that in the second embodiment based on the within-cap evaporation rate calculated more accurately than that in the second embodiment.

Fourth Embodiment

In the present embodiment, a case is explained where the printing apparatus 1 includes a mechanism to derive ink density information and the circulation interval of ink is changed in accordance with the density information.

About Density Information

In the following, density information is explained. In the present embodiment, the print controller 202 acquires ink density information (referred to as density $N_c$) at the time of determining the circulation interval. As the density $N_c$, a value calculated by an expression below is stored in the ROM 203 and it is possible for the print controller 202 to acquire the density $N_c$ at any timing.

$$N_{X+1}=(N_X\times(J_n-I_n)\div(J_n-I_n-V)$$

Here, $N_{X+1}$ indicates the density after the printing operation and $N_X$ indicates the density before the printing operation. Further, $J_n$ indicates the amount of ink within a circulation system of the black ink before the printing operation, $I_n$ indicates the amount of ink ejected by printing, and V indicates the amount of evaporation from the circulation system. The print controller 202 calculates $N_{X+1}$ for each printing operation and overwrites the ROM 203 by the calculated value as the density $N_c$ and saves.

About Determination Method of Circulation Interval Based on Density Information The print controller 202 refers to a table as illustrated in FIG. 16 and determines the circulation interval corresponding to the acquired density $N_c$. In the case where the table shown in FIG. 16 is used, for example, on a condition that the within-cap evaporation rate count value is 200 and the density $N_c$ is 0.087, the circulation interval is 13.5 hours. The table in FIG. 16 is merely exemplary and it may also be possible to use another table holding value ranges of the within-cap evaporation rate count and the density $N_c$ and the circulation interval values corresponding thereto. However, in the table such as this, settings are performed generally so that the larger the within-cap evaporation rate count value, or the higher the density $N_c$, the shorter the circulation interval is. The reason is that the larger the within-cap evaporation rate count value, or the higher the density $N_c$, the more the evaporation of ink progresses, and therefore, ink easily thickens and it is necessary to perform circulation of ink frequently. Here, the case is explained where a table is used, but it may also be possible to calculate the circulation interval by using a mathematical expression in which the within-cap evaporation rate count value and the density $N_c$ are substituted in place of using a table.

About Effect of the Present Embodiment

In the present embodiment, the circulation interval is derived by also taking into consideration the ink density information, in addition to the within-cap evaporation rate count value. Consequently, it is made possible to keep the inside of the print head 8 in a printable state (to secure ejection stability of the ejection portion 1000) by circulating ink with a more appropriate frequency than that in the above-described embodiment.

Fifth Embodiment

In the present embodiment, a case is explained where the time during which ink is circulated (referred to as circulation execution time) is changed in accordance with temperature.

Figures 17A, 17B:
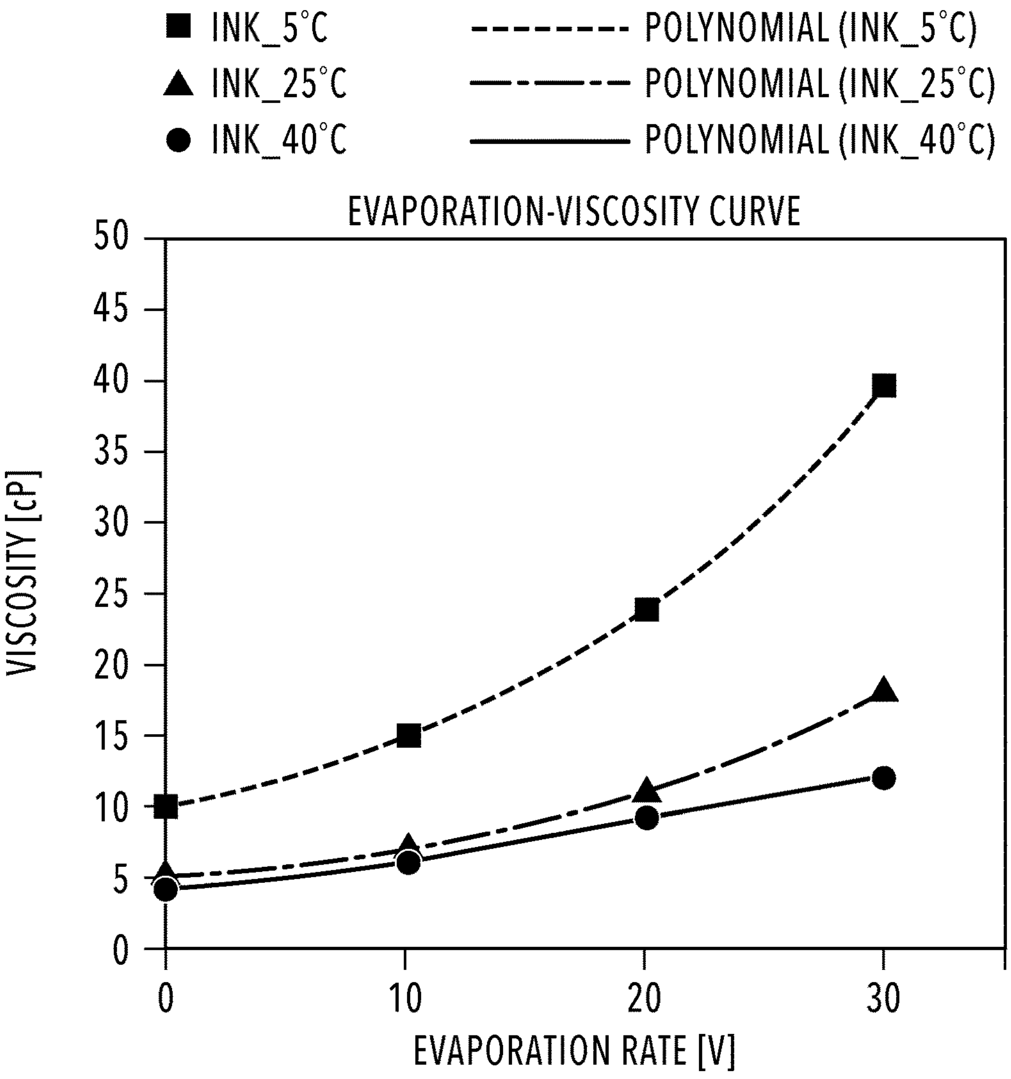
FIG. 17A and FIG. 17B are explanatory diagrams of timer circulation processing in a fifth embodiment.

The print controller 202 refers to a table as shown in FIG. 17A and derives the circulation execution time corresponding to the acquired temperature. Here, as the temperature that the print controller 202 acquires, it may be possible to use the temperature in the installation environment of the printing apparatus 1 described above. Alternatively, in the case where the printing apparatus 1 includes a mechanism to measures the temperature of the print head 8, it may also be possible to use the measured temperature of the print head 8.

In the case where the table shown in FIG. 17A is used, for example, on a condition that the temperature is 20° C., the circulation execution time is 2 m. The table in FIG. 17A is merely exemplary and it may be possible to use a table holding a value range of temperature and the circulation execution time values corresponding thereto. However, in the table such as this, settings are performed generally so that the higher the temperature, the shorter the circulation execution time is. The reason is that the higher the temperature, the lower the viscosity of ink is as shown in FIG. 17B, and therefore, it is possible to restore the ejection stability of the ejection portion 1000 in a short circulation execution time. Here, the case is explained where a table is used, but it may also be possible to calculate the circulation execution time by using a mathematical expression in which the value of temperature is substituted in place of using a table.

About Effect of the Present Embodiment

By the present embodiment, it is made possible to perform circulation for an appropriate time in accordance with temperature.

Sixth Embodiment

In the present embodiment, a case is explained where the printing apparatus 1 includes a head temperature adjustment mechanism to adjust the temperature of the print head 8 and the circulation execution time is changed in accordance with the set temperature of the head temperature adjustment mechanism.

The print controller 202 refers to a table as shown in FIG. 18 and derives the circulation execution time corresponding to the acquired set temperature of the head temperature adjustment mechanism. The table in FIG. 18 is merely exemplary and it may be possible to use another table holding values of set temperature of the head temperature adjustment mechanism and values of the circulation execution time corresponding thereto. However, in the table such as this, settings are performed generally so that the higher the set temperature of the head temperature adjustment mechanism, the shorter the circulation execution time is. The reason is that the higher the set temperature of the head temperature adjustment mechanism, the lower the viscosity of ink is as explained in the fifth embodiment, and therefore, it is possible to restore the ejection stability of the ejection portion 1000 in a short circulation execution time. Here, the case where a table is used is explained, but it may also be possible to calculate the circulation execution time by using a mathematical expression in which the value of temperature is substituted in place of using a table. Further, an embodiment is also considered in which a plurality of tables as shown in FIG. 18 is stored in the ROM 203 and a table is selected and used in accordance with power that can be consumed and a user setting.

About Effect of the Present Embodiment

By the present embodiment, it is made possible to perform circulation for an appropriate time in accordance with the set temperature of the head temperature adjustment mechanism. Further, in the present embodiment, circulation is performed in the cap closed state, and therefore, even in the case where the target temperature of the head temperature adjustment mechanism is set to a temperature higher than the temperature during printing, it is possible to suppress evaporation of moisture in ink.

Seventh Embodiment

In the present embodiment, in the case where the timer circulation processing is repeated as in the first to third embodiments, the moisture evaporated from the ink at the ejection port is absorbed by an absorbent arranged in the cap member 10*a* or ink or the like impregnated in an absorbent. In view of that the inside of the cap member 10*a* becomes wet by the absorbent or the like that absorbs moisture as described above and the progress of evaporation of moisture from the ink at the ejection port is suppressed, subtraction is performed for the within-cap evaporation rate count.

In the following, timer circulation processing in the present embodiment is explained by using FIG. 19A.

The processing at step S1910 to S1960 is the same as the processing at step S1510 to step S1560.

At step S1970, the print controller 202 updates the timer circulation time counter by adding 1 thereto.

At step S1980, the print controller 202 performs within-cap evaporation rate subtraction processing by timer circulation to subtract the amount of fluctuations in the within-cap evaporation rate due to the absorbent having absorbed moisture from the within-cap evaporation rate count value. Details of the within-cap evaporation rate subtraction processing by timer circulation will be described later by using FIG. 19B.

The processing at step S1990 to step S2020 is the same as the processing at step S1570 to step S1600. In the present embodiment, further at step S2030, the print controller 202 resets the timer circulation time counter.

About Within-Cap Evaporation Rate Subtraction Processing by Timer Circulation

In the following, the above-described within-cap evaporation rate subtraction processing (S1980) by timer circulation is explained in detail by using FIG. 19B.

At step S1981, the print controller 202 acquires the current within-cap evaporation rate count value.

At step S1982, the print controller 202 acquires the timer circulation time counter value.

At step S1983, the print controller 202 derives the subtraction value corresponding to the timer circulation time counter value acquired at step S1982 by referring to a table as illustrated in FIG. 19C. In the following, a derivation method of the subtraction value is explained in detail.

In the case where timer circulation is performed and fresh ink hat has not thickened is supplied to the ejection port, the moisture content of the absorbent arranged in the cap member 10*a* increases by absorbing moisture evaporated from the ink. As a result of this, the inside of the cap member 10*a* enters a wet state due to the absorbent whose moisture content has increased and a state where the within-cap evaporation rate is low is brought about.

Further, by experimental results, it is known that the smaller the timer circulation time, the higher the humidification effect inside the cap per timer circulation is. Because of this, as shown in FIG. 19C, the smaller the timer circulation time, the larger the subtraction value that is subtracted from the within-cap evaporation rate count value is. As the timer circulation time increases, the moisture inside the cap and the moisture of the absorbent saturate, and therefore, the humidification effect inside the cap due to the evaporation of moisture from the nozzle is hardly obtained. Because of this, in the case where the timer circulation time exceeds 32, the subtraction value is set to 0.

At step S1984, the print controller 202 updates the within-cap evaporation rate count value based on the acquired subtraction value. Specifically, the print controller 202 overwrites the ROM 203 by the value obtained by subtracting the subtraction value from the within-cap evaporation rate count value stored in the RAM 204.

About Effect of Present Embodiment

In the present embodiment, the within-cap evaporation rate is counted by also taking into consideration the humidification effect inside the cap due to timer circulation. Consequently, it is made possible to keep the inside the print head 8 in a printable state (to secure ejection stability of the ejection portion 1000) by circulating ink with a more appropriate frequency than that in the third embodiment based on the within-cap evaporation rate derived more accurately than that in the third embodiment.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

By the present invention, it is possible to bring a print head into a liquid ejectable state while reducing waste ink.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-130434, filed Jul. 3, 2017, which is hereby incorporated by reference wherein in its entirety.

What is claimed is:

1. A printing apparatus comprising:

a pump that flows liquid;

a circulation path including a first flow path for circulating the liquid so that the liquid entering a print head exits from the print head, and reenters the print head, and a second flow path for circulating the liquid to feed the liquid to an upstream side of the pump, the second flow path branching from the first flow path downstream of the pump provided in the first flow path in a direction in which the liquid flows; and an obtaining unit configured to obtain information on a temperature, wherein a time during which the pump circulates the liquid in the circulation path varies based on the information from the obtaining unit.

2. The printing apparatus according to claim 1, wherein in a case where a temperature indicated by the information obtained by the obtaining unit is a first temperature, the pump operates during a first time, and in a case where the temperature indicated by the information obtained by the obtaining unit is a second temperature which is lower than the first temperature, the pump operates during a second time which is longer than the first time.

3. The printing apparatus according to claim 1, wherein the obtaining unit obtains a temperature of an installation environment of the printing apparatus.

4. The printing apparatus according to claim 1, wherein the obtaining unit is a thermometer.

5. The printing apparatus according to claim 1, wherein the circulation path includes at least part of a flow path in which the liquid flows which is to be supplied to the print head flows from a storage unit that stores the liquid in a case where the liquid is ejected from an ejection port of the print head.

6. The printing apparatus according to claim 5, wherein the printing apparatus further comprises a second storage unit that stores the liquid to be supplied to the storage unit.

7. The printing apparatus according to claim 1, wherein the circulation path is a flow path connected to the print head.

8. The printing apparatus according to claim 1, wherein the pump circulates the liquid in the circulation path in response to a circulation instruction issued at predetermined timing.

9. The printing apparatus according to claim 8, wherein the predetermined timing is timing in a period in which the printing apparatus does not receive, from a user, an instruction to print an image.

10. The printing apparatus according to claim 8, wherein the predetermined timing is timing in a period in which ink is not ejected from an ejection port of the print head.

11. The printing apparatus according to claim 8, wherein the predetermined timing is timing at which a period in which the liquid is not ejected becomes a predetermined period.

12. The printing apparatus according to claim 1, wherein the pump circulates the liquid in the circulation path in a case where the printing apparatus does not receive, from a user, an instruction to print an image.

13. The printing apparatus according to claim 1, wherein the pump circulates the liquid in the circulation path in a case where ink is not ejected from an ejection port of the print head.

14. The printing apparatus according to claim 1, wherein the pump stops the circulation operation in a case where the printing apparatus receives, from a user, an instruction to print an image during an operation of circulating the liquid in the circulation path.

15. The printing apparatus according to claim 1, wherein the print head has an ejection port surface on which an ejection port is provided, the printing apparatus further comprises a capping mechanism that caps the ejection port surface, and the pump operates in a state in which the ejection port surface is capped.

16. The printing apparatus according to claim 1, wherein the printing apparatus comprises the print head.

17. The printing apparatus according to claim 1, wherein the printing apparatus comprises a storage unit that stores the liquid to be supplied to the print head.

18. The printing apparatus according to claim 1, wherein a valve is provided in the second flow path for circulating the liquid to feed the liquid to the upstream side of the pump, the second flow path branching from the first flow path for circulating the liquid so that the liquid exits from the print head downstream of the pump and reenters the print head.

19. The printing apparatus according to claim 1, wherein the pump is driven to circulate the liquid in the second flow path.

20. A printing apparatus comprising:

a pump that flows liquid; and a circulation path including a first flow path for circulating the liquid so that the liquid entering a print head exits from the print head, and reenters the print head, and a second flow path for circulating the liquid to feed the liquid to an upstream side of the pump, the second flow path branching from the first flow path downstream of the pump provided in the first flow path in a direction in which the liquid flows;

wherein in a case where a temperature of an installation environment of the printing apparatus is a first temperature, the pump circulates the liquid in the circulation path during a first time, and in a case where the temperature of the installation environment of the printing apparatus is a second temperature which is lower than the first temperature, the pump circulates the liquid in the circulation path during a second time which is longer than the first time.

21. The printing apparatus according to claim 20, wherein the circulation path includes at least part of a flow path in which the liquid flows which is to be supplied to the print head flows from a storage unit that stores the liquid in a case where the liquid is ejected from an ejection port of the print head.

22. The printing apparatus according to claim 21, wherein the printing apparatus further comprises a second storage unit that stores the liquid to be supplied to the storage unit.

23. The printing apparatus according to claim 20, wherein the circulation path is a flow path connected to the print head.

24. The printing apparatus according to claim 20, wherein the pump circulates the liquid in the circulation path in response to a circulation instruction issued at predetermined timing.

25. The printing apparatus according to claim 24, wherein the predetermined timing is timing in a period in which the printing apparatus does not receive, from a user, an instruction to print an image.

26. The printing apparatus according to claim 24, wherein the predetermined timing is timing in a period in which ink is not ejected from an ejection port of the print head.

27. The printing apparatus according to claim 24, wherein the predetermined timing is timing at which a period in which the liquid is not ejected becomes a predetermined period.

28. The printing apparatus according to claim 20, wherein the pump circulates the liquid in the circulation path in a case where the printing apparatus does not receive, from a user, an instruction to print an image.

29. The printing apparatus according to claim 20, wherein the pump circulates the liquid in the circulation path in a case where ink is not ejected from an ejection port of the print head.

30. The printing apparatus according to claim 20, wherein the pump stops the circulation operation in a case where the printing apparatus receives, from a user, an instruction to print an image during an operation of circulating the liquid in the circulation path.

31. The printing apparatus according to claim 20, wherein the print head has an ejection port surface on which an ejection port is provided, the printing apparatus further comprises a capping mechanism that caps the ejection port surface, and the pump operates in a state in which the ejection port surface is capped.

32. The printing apparatus according to claim 20, wherein the printing apparatus comprises the print head.

33. The printing apparatus according to claim 20, wherein the printing apparatus comprises a storage unit that stores the liquid to be supplied to the print head.

34. The printing apparatus according to claim 20, wherein a valve is provided in the second flow path for circulating the liquid to feed the liquid to the upstream side of the pump, the second flow path branching from the first flow path for circulating the liquid so that the liquid exits from the print head downstream of the pump and reenters the print head.

35. The printing apparatus according to claim 20, wherein the pump is driven to circulate the liquid in the second flow path.

36. A control method for controlling a printing apparatus, wherein the printing apparatus comprises:

a pump that flows liquid;

a circulation path including a first flow path for circulating the liquid so that the liquid entering a print head exits from the print head, and reenters the print head, and a second flow path for circulating the liquid to feed the liquid to an upstream side of the pump, the second flow path branching from the first flow path downstream of the pump provided in the first flow path in a direction in which the liquid flows; and an obtaining unit configured to obtain information on a temperature, wherein the control method comprises:

varying a time during which the pump circulates the liquid in the circulation path based on the information from the obtaining unit.

37. The control method according to claim 36, wherein in a case where a temperature indicated by the information obtained by the obtaining unit is a first temperature, the pump operates during a first time, and in a case where the temperature indicated by the information obtained by the obtaining unit is a second temperature which is lower than the first temperature, the pump operates during a second time which is longer than the first time.

38. The control method according to claim 36, wherein the obtaining unit obtains a temperature of an installation environment of the printing apparatus.

39. The control method according to claim 36, wherein the obtaining unit is a thermometer.

40. The control method according to claim 36, wherein the circulation path includes a flow path in which the liquid flows which is to be supplied to the print head from a storage unit that stores the liquid in a case where the liquid is ejected from an ejection port of the print head.

41. The control method according to claim 36, wherein the circulation path is a flow path connected to the print head.

42. The control method according to claim 36, wherein the pump circulates the liquid in the circulation path in response to a circulation instruction issued at predetermined timing.

43. The control method according to claim 42, wherein the predetermined timing is timing in a period in which the printing apparatus does not receive, from a user, an instruction to print an image.

44. The control method according to claim 42, wherein the predetermined timing is timing in a period in which ink is not ejected from an ejection port of the print head.

45. The control method according to claim 42, wherein the predetermined timing is timing at which a period in which the liquid is not ejected becomes a predetermined period.

46. The control method according to claim 36, wherein the pump circulates the liquid in the circulation path in a case where the printing apparatus does not receive, from a user, an instruction to print an image.

47. The control method according to claim 36, wherein the pump circulates the liquid in the circulation path in a case where ink is not ejected from an ejection port of the print head.

48. The control method according to claim 36, wherein the pump stops the circulation operation in a case where the printing apparatus receives, from a user, an instruction to print an image during an operation of circulating the liquid in the circulation path.

49. The control method according to claim 36, wherein the print head has an ejection port surface on which an ejection port is provided, the printing apparatus further comprises a capping mechanism that caps the ejection port surface, and the pump operates in a state in which the ejection port surface is capped.

50. The control method according to claim 36, wherein a valve is provided in the second flow path.

51. The control method according to claim 36, wherein the pump is driven to circulate the liquid in the second flow path.

52. A control method for controlling a printing apparatus, wherein the printing apparatus comprises:

a pump that flows liquid;

a circulation path including a first flow path for circulating the liquid so that the liquid entering a print head exits from the print head, and reenters the print head, and a second flow path for circulating the liquid to feed the liquid to an upstream side of the pump, the second flow path branching from the first flow path downstream of the pump provided in the first flow path in a direction in which the liquid flows, wherein the control method comprises:

in a case where a temperature of an installation environment of the printing apparatus is a first temperature, the pump circulating the liquid in the circulation path during a first time; and in a case where the temperature of the installation environment of the printing apparatus is a second temperature which is lower than the first temperature, the pump circulating the liquid in the circulation path during a second time which is longer than the first time.

* * * * *